US012552061B2

(12) United States Patent
Hachisuka et al.

(10) Patent No.: US 12,552,061 B2
(45) Date of Patent: Feb. 17, 2026

(54) PORTABLE MACHINING APPARATUS

(71) Applicant: MAKITA CORPORATION, Anjo (JP)

(72) Inventors: Akira Hachisuka, Anjo (JP); Takuji Kimura, Anjo (JP); Hiroka Suzuki, Anjo (JP); Daiki Imaida, Anjo (JP)

(73) Assignee: MAKITA CORPORATION, Anjo (JP)

( * ) Notice: Subject to any disclaimer, the term of this patent is extended or adjusted under 35 U.S.C. 154(b) by 679 days.

(21) Appl. No.: 17/958,623

(22) Filed: Oct. 3, 2022

(65) Prior Publication Data
US 2023/0109320 A1    Apr. 6, 2023

(30) Foreign Application Priority Data

Oct. 4, 2021 (JP) .................................. 2021-163253
Aug. 18, 2022 (JP) .................................. 2022-130517

(51) Int. Cl.
B26D 3/06 (2006.01)
(52) U.S. Cl.
CPC ..................................... B26D 3/06 (2013.01)
(58) Field of Classification Search
CPC ..... B25F 3/00; B25F 5/02; B27C 5/10; B26D 3/06
See application file for complete search history.

(56) References Cited

U.S. PATENT DOCUMENTS

2012/0241049 A1    9/2012  Kato et al.
2018/0126537 A1*   5/2018  Tanaka ................. G05B 13/024
2022/0396000 A1*  12/2022  Mondich .................. B27C 5/10
2024/0001581 A1*   1/2024  Kumakura ............... B25F 5/02

FOREIGN PATENT DOCUMENTS

| CN | 108015723 A | 5/2018 |
| JP | 2012-196866 A | 10/2012 |
| JP | 2018-79632 A | 5/2018 |
| JP | 2018-079632 A | 5/2018 |

OTHER PUBLICATIONS

Jun. 26, 2025 Office Action issued in Chinese Patent Application No. 202211192995.7.

* cited by examiner

Primary Examiner — Daniel Jeremy Leeds
(74) Attorney, Agent, or Firm — Oliff PLC

(57) ABSTRACT

A portable machining apparatus facilitates addition of new electric components with an intended arrangement of various electric components. The portable machining apparatus includes a housing, an electric motor installed in the housing and including a motor shaft extending in an axial direction, a tip tool partially or fully exposed outside the housing and rotatable by the electric motor, a controller installed in the housing and aligned with the electric motor in the axial direction to control an operation of the electric motor, and a first electric component and a second electric component installed in an electric component compartment between the controller and the electric motor. The first electric component and the second electric component are aligned in a same plane perpendicular to an axis of the motor shaft.

19 Claims, 18 Drawing Sheets

PORTABLE MACHINING APPARATUS

CROSS-REFERENCE TO RELATED APPLICATIONS

This application claims the benefit of priority to Japanese Patent Application No. 2021-163253, filed on Oct. 4, 2021, and Japanese Patent Application No. 2022-130517, filed on Aug. 18, 2022, the entire contents of both of which are hereby incorporated by reference.

BACKGROUND

1. Technical Field

The present disclosure relates to a relatively small portable machining apparatus such as a laminate trimmer used for, for example, wood trimming or grooving, and manually movable or operable by a user to perform various machines.

2. Description of the Background

As described in Japanese Unexamined Patent Application Publication No. 2012-196866 (hereafter, Patent Literature 1) or Japanese Unexamined Patent Application Publication No. 2018-79632 (hereafter, Patent Literature 2), a laminate trimmer includes a cylindrical housing holdable with one hand and an electric motor installed in the housing. The electric motor is vertically installed in the housing with the motor axis coaxial with the axis of the housing. A blade rotated by the electric motor protrudes downward from a base attached to a lower portion of the housing. With the housing held with one hand and the base being in contact with the upper surface of a workpiece, the blade is moved along the edge of the workpiece to perform trimming.

In the laminate trimmer in Patent Literature 1, the electric motor includes an upper portion extending to or around an upper portion of the housing. Thus, various electric components including a control board and a gearshift controller are accommodated in a space-saving manner in the upper portion of the housing around the upper portion of the electric motor.

The electric motor in the laminate trimmer in Patent Literature 2 is a direct current (DC) brushless motor. The DC brushless motor is short in the axial direction, and is thus likely to create unused space between the end of the electric motor and the end of the housing. In this case, various electric components including a controller and a gearshift dial are accommodated in a space-saving manner in an upper portion of the housing using the unused space between the electric motor and a battery.

BRIEF SUMMARY

A portable machining apparatus such as a laminate trimmer is typically to be compact (operable) to allow a user to easily hold and move the apparatus. A known laminate trimmer includes various electric components accommodated in a space-saving manner in or around the upper portion of the housing. This structure cannot receive new electric components without decreasing compactness.

One or more aspects of the present disclosure are directed to a portable machining apparatus that facilitates addition of new electric components with an intended arrangement of various electric components.

A first aspect of the present disclosure provides a portable machining apparatus, including:

a housing;
an electric motor installed in the housing, the electric motor including a motor shaft extending in an axial direction;
a tip tool partially or fully exposed outside the housing, the tip tool being rotatable by the electric motor;
a controller installed in the housing and aligned with the electric motor in the axial direction, the controller being configured to control an operation of the electric motor; and
a first electric component and a second electric component installed in an electric component compartment between the controller and the electric motor, the first electric component and the second electric component being aligned in a same plane perpendicular to an axis of the motor shaft.

A second aspect of the present disclosure provides a portable machining apparatus, including:

a housing;
an electric motor installed in the housing;
a contact portion extending perpendicular to a motor shaft of the electric motor, the contact portion being configured to come in contact with a workpiece;
a battery attachable at a position opposite to the contact portion from the electric motor;
a tip tool protruding from the housing toward the contact portion and rotatable by the electric motor;
a controller installed in the housing between the battery and the electric motor, the controller being configured to control an operation of the electric motor; and
a wireless communication adaptor removably attached to an electric component compartment between the controller and the electric motor to perform wireless communication with an external device.

A third aspect of the present disclosure provides an electric work machine, including:

a battery;
an electric motor installed in a housing and drivable by the battery;
a controller installed in the housing to control an operation of the electric motor;
a first electric component and a second electric component installed in an electric component compartment in the housing; and
an internal support positioning the first electric component and the second electric component relative to each other, the internal support including
 a first positioner located at a first side of the internal support and positioning the first electric component, and
 a second positioner located at a second side of the internal support opposite to the first side and positioning the second electric component,
wherein the first electric component, the internal support, and the second electric component are linearly aligned with one another.

DETAILED DESCRIPTION

First Embodiment

As shown in FIGS. 1 to 4, a portable machining apparatus 1 according to a first embodiment is a woodwork portable cutting tool called a laminate trimmer. The portable machining apparatus 1 is rechargeable. The portable machining apparatus 1 includes a window 6d. An operator holds the portable machining apparatus 1 with the window 6d facing opposite from the operator. A portion of the portable machining apparatus 1 including the window 6d is defined as the front, and a portion of the portable machining apparatus 1 opposite to the window 6d is defined as the rear. The right, left, up, and down correspond to the directions viewed from the operator when the front of the portable machining apparatus 1 faces the operator.

Figure 6:
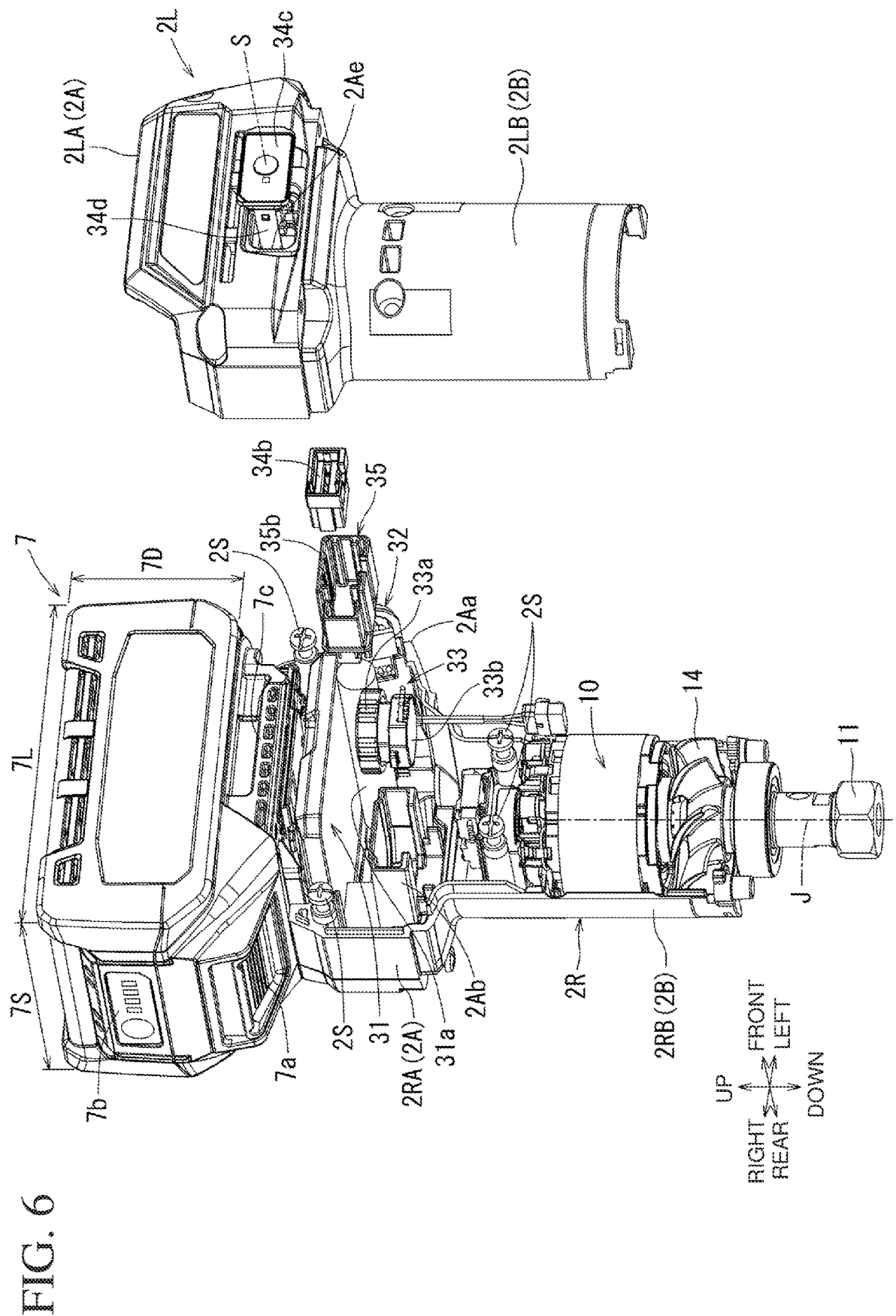
FIG. 6 is an exploded perspective view of the portable machining apparatus according to the first embodiment as viewed diagonally from the left rear.
Figure 7:
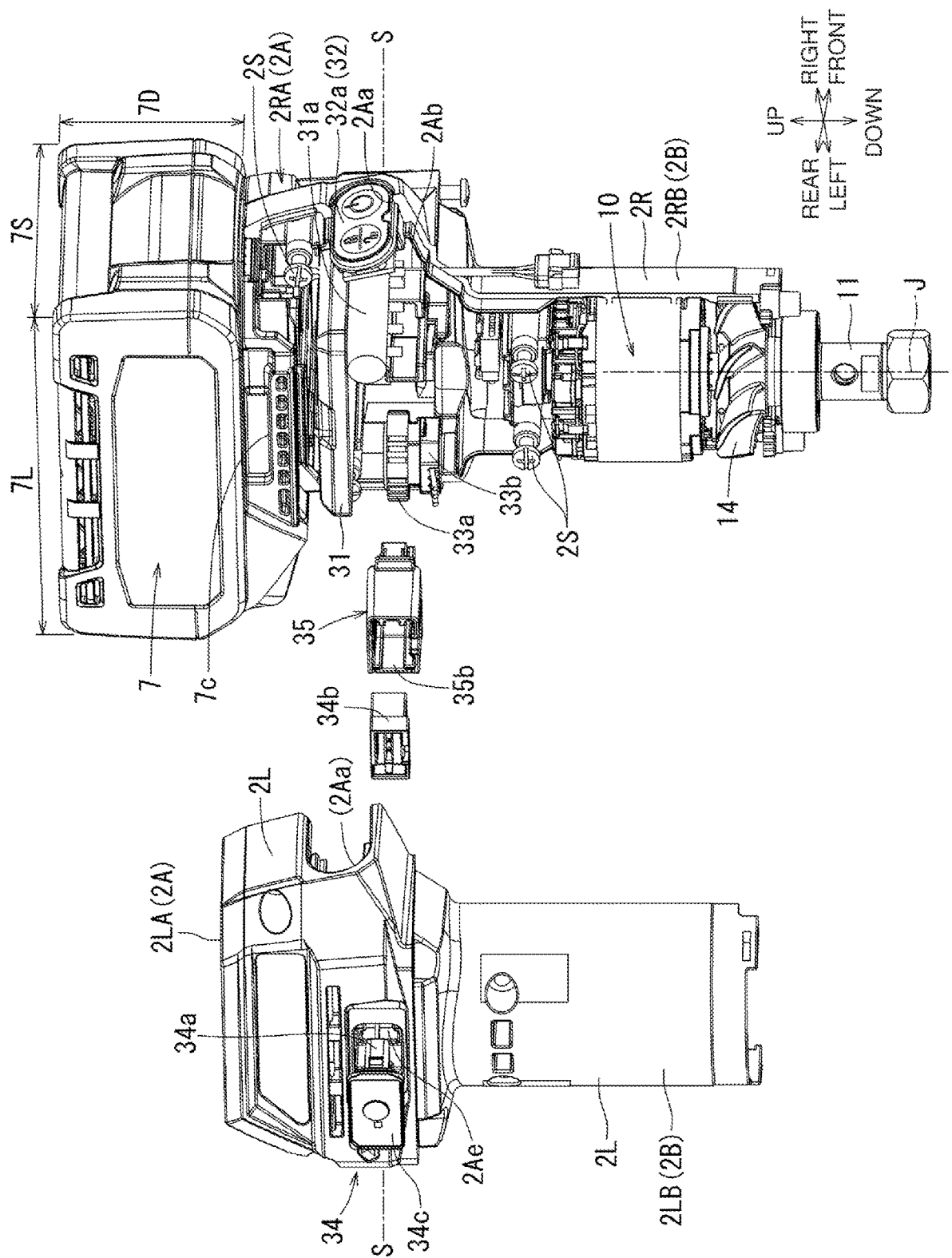
FIG. 7 is an exploded perspective view of the portable machining apparatus according to the first embodiment as viewed diagonally from the left front.
Figure 8:
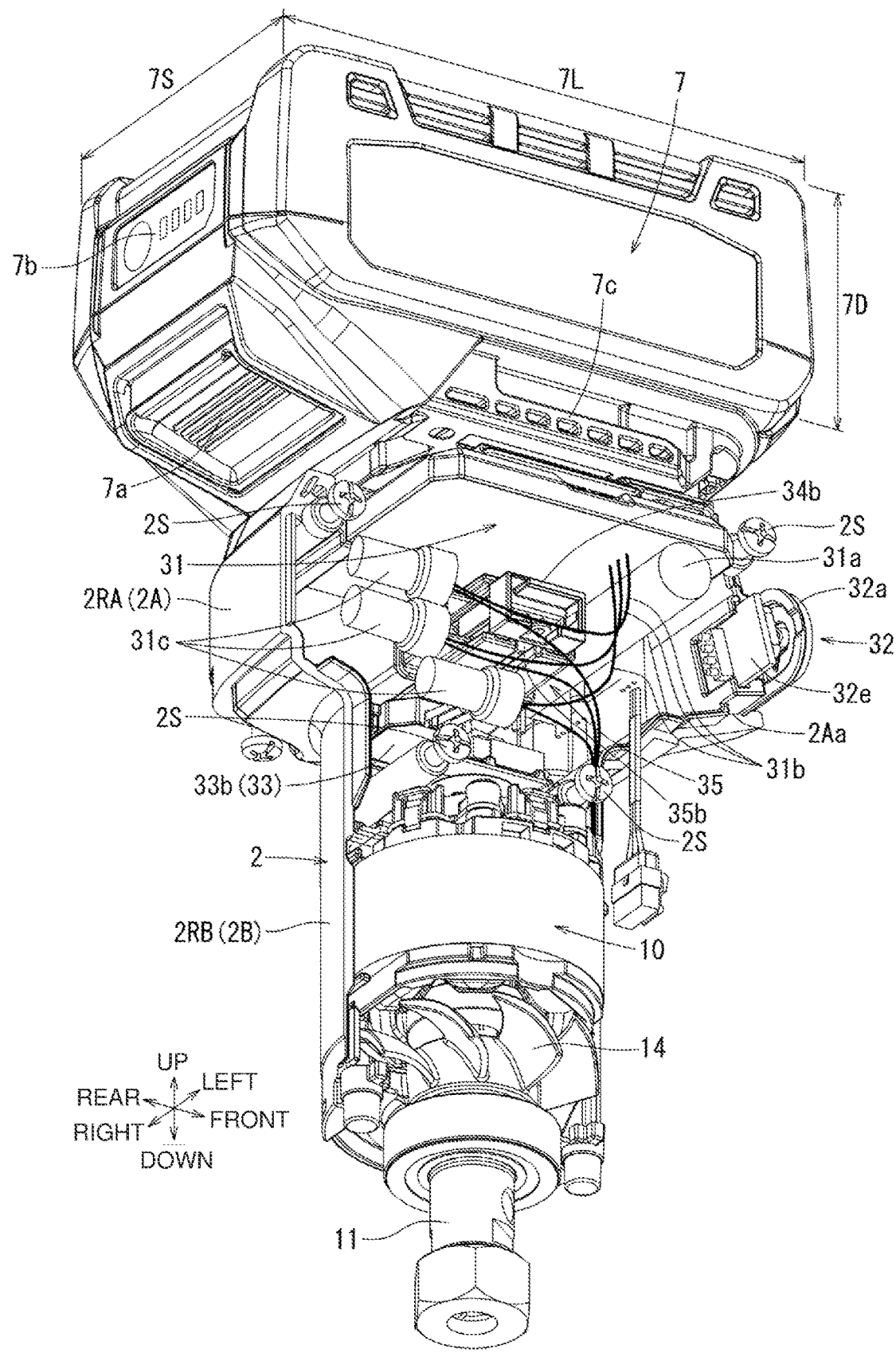
FIG. 8 is an exploded perspective view of the portable machining apparatus according to the first embodiment as viewed diagonally from the left rear and diagonally from the below.

The portable machining apparatus 1 includes a housing 2. As shown in FIGS. 6 to 9, the housing 2 is dividable into left and right halves. The housing 2 includes a right half 2R and a left half 2L. The right and left halves 2R and 2L are screwed together. FIGS. 6 to 8 show four screws 2S for screwing. For convenience, FIGS. 6 to 8 show the screws 2S screwed into the right half 2R. However, with the right and left halves 2R and 2L in contact with each other, the four screws 2S are actually screwed.

The housing 2 is formed from a molded synthetic resin. The housing 2 includes a cylinder 2B. The cylinder 2B has a vertically extending axis. An electric motor 10 is installed in the cylinder 2B. The electric motor 10 includes a motor shaft 11 extending vertically. The motor shaft 11 has a motor axis J coaxial or parallel with the axis of the cylinder 2B.

A raised portion 2A is integral with an upper portion of the cylinder 2B. The raised portion 2A is a substantially rectangular box. The right half 2R includes a right cylinder 2RB and a right raised portion 2RA. The left half 2L includes a left cylinder 2LB and a left raised portion 2LA. As shown in FIGS. 6 to 9, the right cylinder 2RB and the left cylinder 2LB are assembled into the cylinder 2B. The right raised portion 2RA and the left raised portion 2LA are assembled into the raised portion 2A.

The housing 2 includes a cylindrical cover case 20 on the outer surface of the cylinder 2B. The cylinder 2B is press-fitted into the cover case 20. The cover case 20 is formed from aluminum.

The electric motor 10 is, for example, a direct current (DC) brushless motor. The motor shaft 11 is rotatably supported by the cylinder 2B about the motor axis J with an upper bearing 12 and a lower bearing 13. A cooling fan 14 is attached to the motor shaft 11. The cooling fan 14 integrally rotates with the motor shaft 11. The rotation of the cooling fan 14 draws outside air into the housing 2 to cool the electric motor 10.

The motor shaft 11 has an upper portion protruding downward from a lower portion of the cylinder 2B. For example, a rod-shaped bit (tip tool 15) is coaxially attached to the protruding portion of the motor shaft 11. The tip tool 15 is easily replaceable with another tip tool as appropriate for, for example, an operational purpose.

A rectangular base 5 (contact portion) is attached to a lower portion of the housing 2. The tip tool 15 protrudes from the lower surface of the base 5. With the base 5 being in contact with the upper surface of the workpiece W, the protruding portion of the tip tool 15 is in contact along the edge of the workpiece W to perform trimming, or the tip tool 15 is moved to cut the edge to perform grooving.

A base attachment 6 is integral with the upper surface of the base 5. The base attachment 6 is C-shaped. The base attachment 6 is fastened along the outer peripheral surface of the housing 2 by tightening a thumbscrew 6a. The base 5 is thus fastened to the lower portion of the housing 2. The base attachment 6 can be unfastened from the housing 2 by loosening the thumbscrew 6a. Fastening or unfastening can adjust the vertical position of the base 5 with respect to the housing 2, and the amount by which the tip tool 15 protrudes from the base 5. This operation can adjust, for example, the grooving depth.

The base attachment 6 includes a wheel gear 6b and a knob dial 6c for fine adjustment. Rotation of the knob dial 6c causes the wheel gear 6b to rotate integrally. The wheel gear 6b is engaged with a rack gear 3 on the outer surface of the housing 2. When the wheel gear 6b is rotated by rotating the knob dial 6c with the base attachment 6 unfastened from the housing 2, the engagement position of the wheel gear 6b with respect to the rack gear 3 is changed. Thus, the base 5 and the base attachment 6 integrally change their vertical positions to finely adjust the vertical position (processing depth) of the base 5 with respect to the tip tool 15. Depth scales 4 indicating the processing depth appear on both sides of the rack gear 3.

The base attachment 6 shields around a processing target portion to block scattering of dust or other matter resulting from processing to the surroundings. The window 6d is located in the front lower surface of the base attachment 6 to allow the operator to visually observe the processing target portion. The tip tool 15 is attachable to or removable from the motor shaft 11 with a hand tool such as a spanner inserted through the window 6d. The base 5 has a through-hole 5a at the center. The motor shall 11 and the tip tool 15 extend through the through-hole 5a. The through-hole 5a exposes an upper portion of the processing target portion.

A battery mount 21 is located on the upper surface of the raised portion 2A. A single battery 7 is removably attached to the battery mount 21. The front-rear direction, the lateral direction (right and left), and the vertical direction (up and down) for the battery 7 attached to the battery mount 21 directly correspond to the directions of the portable machining apparatus 1 illustrated in the drawings.

The battery 7 is a rectangular prism with long sides 7L and short sides 7S. With the battery 7 attached, the long sides 7L correspond to the sides extending in the front-rear or longitudinal direction, and the short sides 7S correspond to the sides extending in the lateral or width direction. The long sides 7L in the first embodiment are longer than the short sides 7S (long sides 7L>short sides 7S). The battery 7 has vertical sides (thickness sides 7D) extending in the height direction. The thickness sides 7D in the first embodiment are shorter than the short sides 7S (short sides 7S>thickness sides 7D). In some embodiments, a high-capacity battery with the thickness sides 7D greater than the short sides 7S may be attached.

Figure 5:
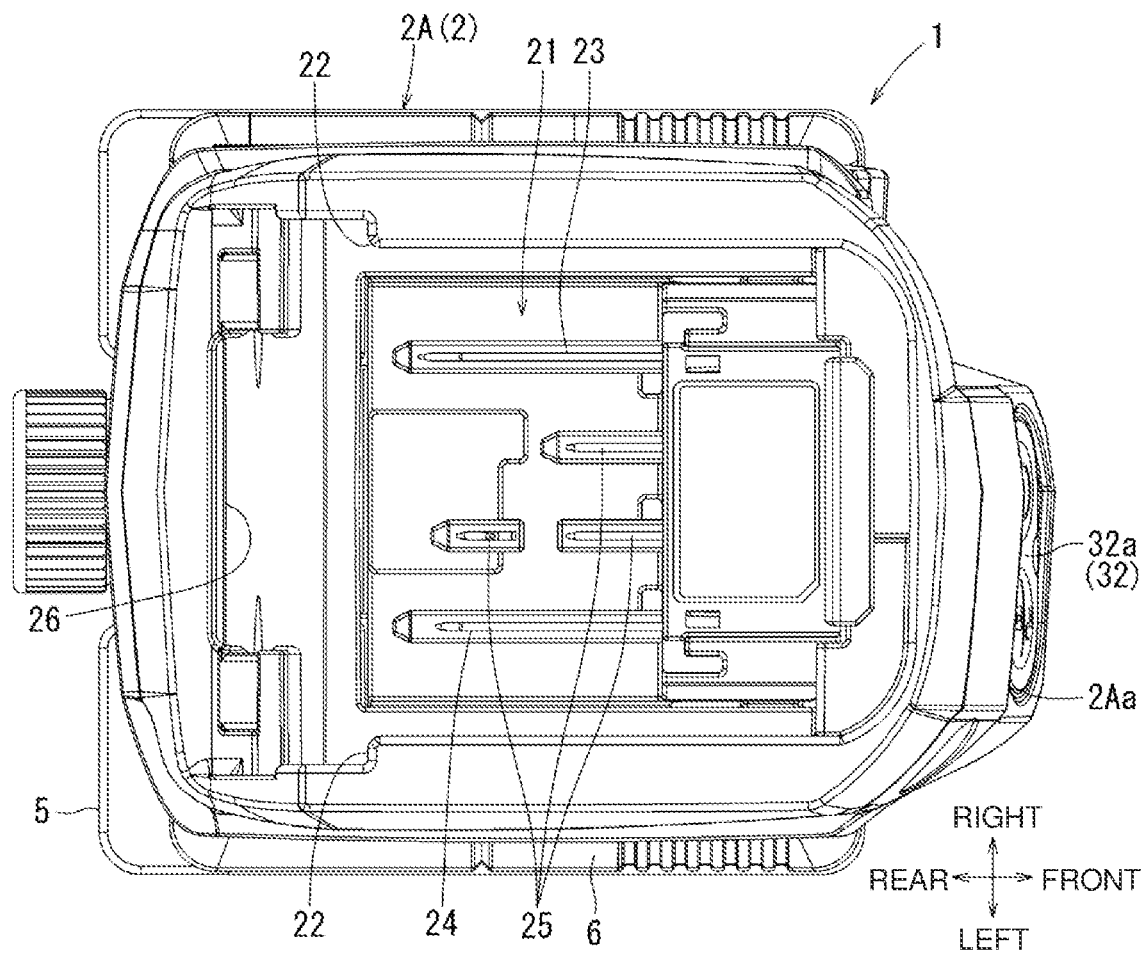
FIG. 5 is a top view of the portable machining apparatus according to the first embodiment with a battery removed as viewed in a direction indicated by arrow V in FIG. 1.

The battery 7 is, for example, a lithium-ion battery attachable in a slidable manner. The battery 7 is mechanically or electrically attached to the battery mount 21 by sliding the battery 7 forward along the battery mount 21. As shown in FIG. 5, the battery mount 21 includes a pair of left and right rail receivers 22. The battery 7 includes a pair of rails 7c on the lower surface. FIGS. 6 to 8 show the left rail 7c. When the pair of rails 7c are engaged with the rail receivers 22 while the battery 7 is being slid forward, the battery 7 is mechanically attached to the battery mount 21. A positive electrode terminal 23 and a negative electrode terminal 24 are arranged between the pair of rail receivers 22. Control terminals 25 are arranged between the positive electrode terminal 23 and the negative electrode terminal 24. When the battery 7 is mechanically attached to the battery mount 21, the positive electrode terminal 23, the negative electrode terminal 24, and the control terminals 25 are electrically connected to a positive electrode terminal receiver, a negative electrode terminal receiver, and control terminal receivers of the battery 7, respectively.

The battery mount 21 has a lock recess 26 at the rear. A lock tab (not shown) on the battery 7 is engaged with the lock recess 26. When the lock tab is engaged with the lock recess 26, the battery 7 attached to the battery mount 21 is locked. As shown in FIGS. 6 and 8, the battery 7 includes a removal button 7a in a rear portion on the lower surface. When the removal button 7a is pressed upward with a fingertip, the lock tab is disengaged from the lock recess 26. Thus, the locked battery 7 is unlocked. The battery 7 can thus be removed from the battery mount 21 by sliding the battery 7 backward. The battery 7 includes a remaining capacity indicator 7b on the rear surface.

Figure 1:
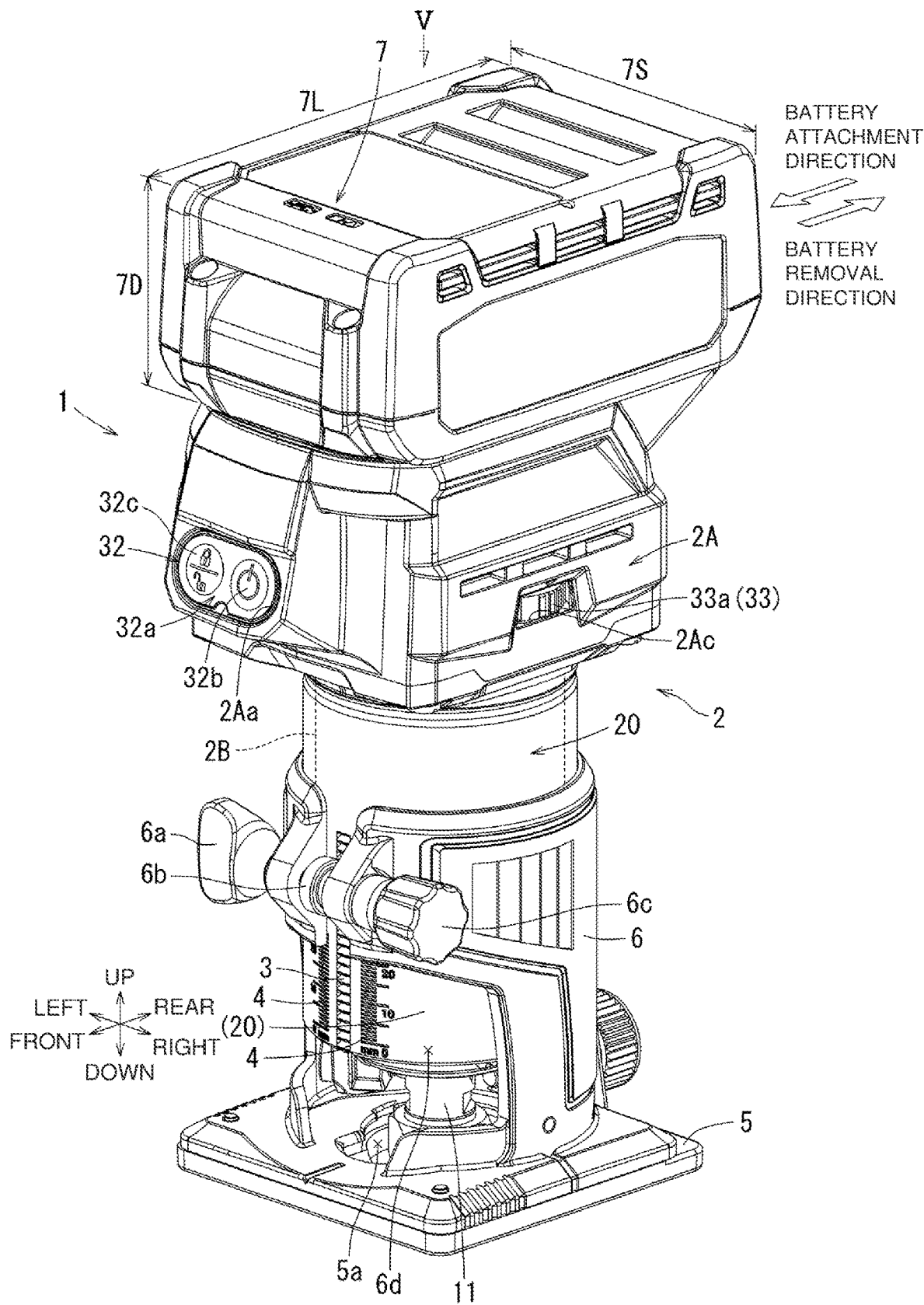
FIG. 1 is an overall perspective view of a portable machining apparatus according to a first embodiment.
Figure 2:
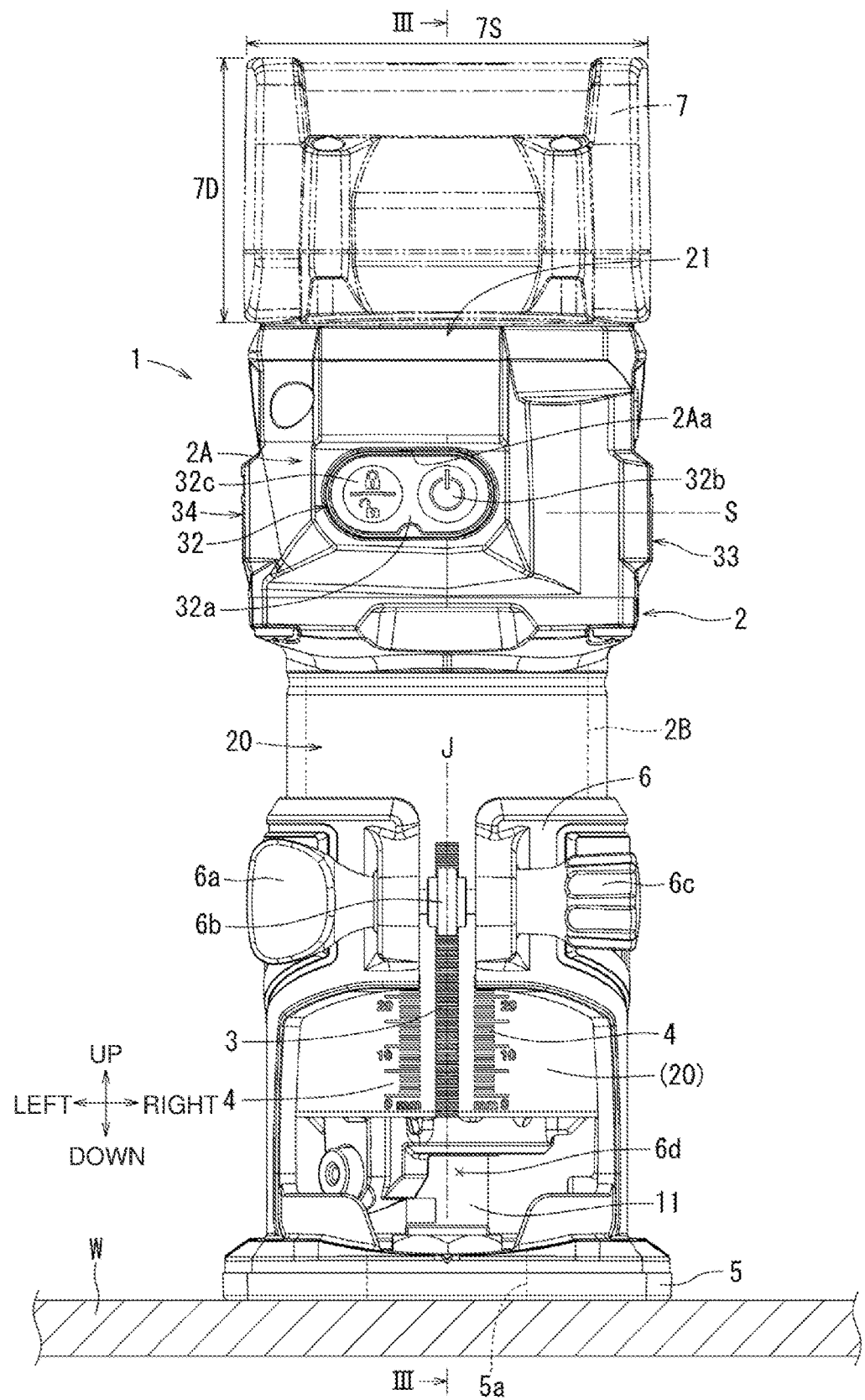
FIG. 2 is a front view of the portable machining apparatus according to the first embodiment.
Figure 4:
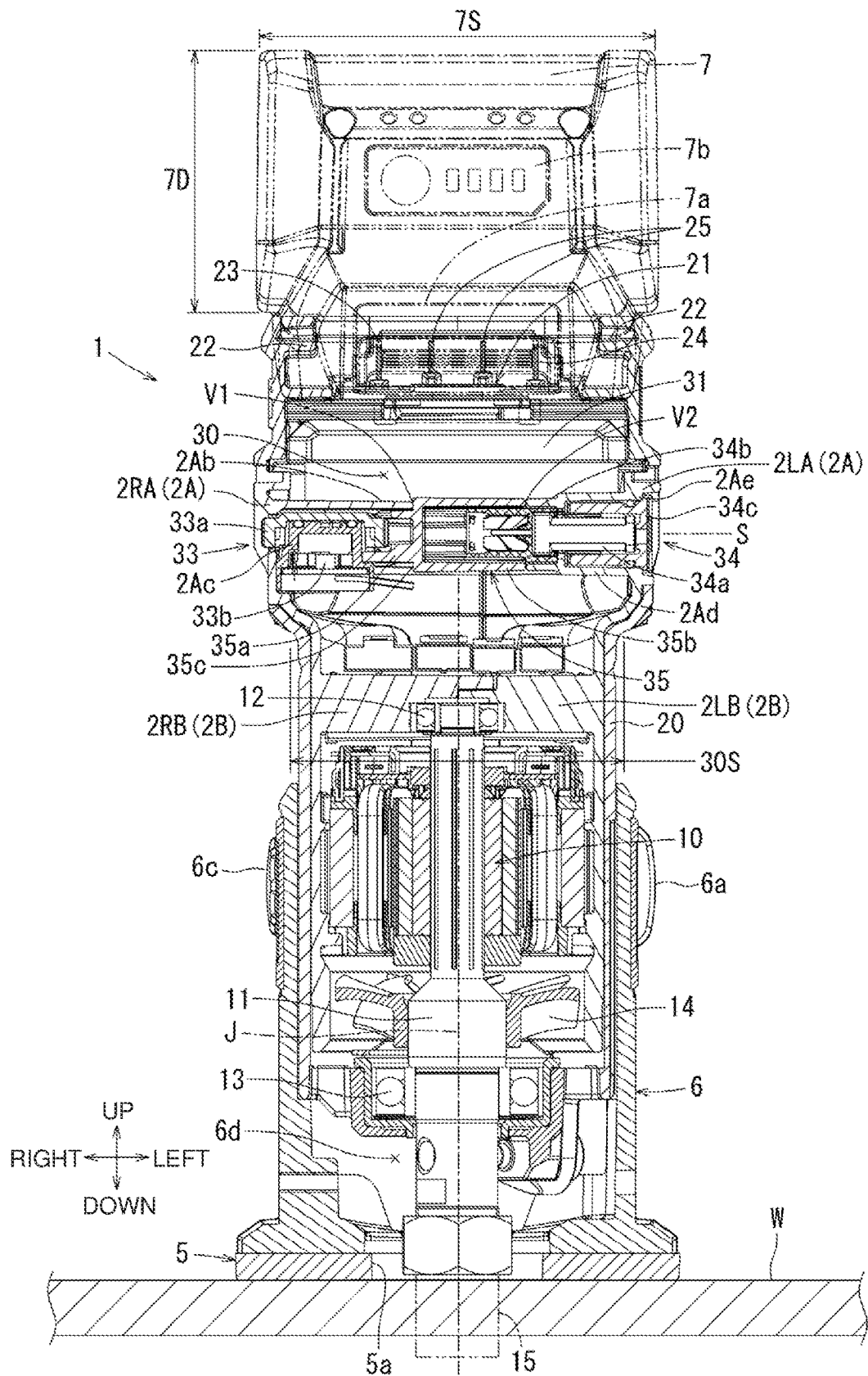
FIG. 4 is a sectional view of the portable machining apparatus according to the first embodiment taken along line IV-IV in FIG. 3 as viewed in a direction indicated by arrows.

The raised portion 2A is a rectangular box that is long in the front-rear direction and short in the lateral direction. The longitudinal direction of the raised portion 2A is aligned with the long sides 7L of the battery 7. The long sides 7L of the battery 7 are aligned with a direction (slide direction) in which the battery 7 is attached to and removed from the battery mount 21. The lateral width direction of the raised portion 2A is aligned with the short sides 7S of the battery 7. As shown in FIGS. 2 and 4, the lateral width of the raised portion 2A is substantially the same as the lateral width of the battery 7.

Figure 3:
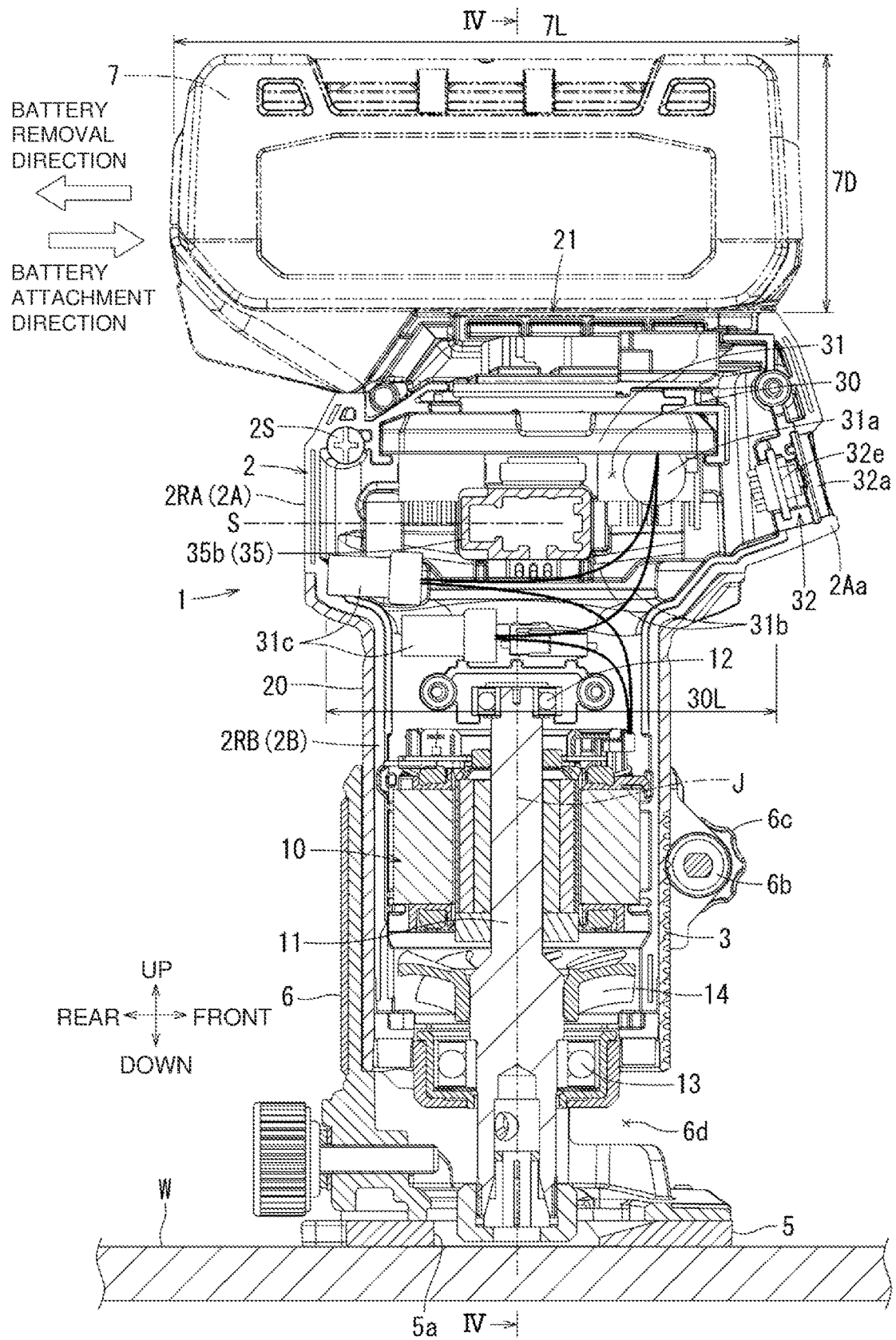
FIG. 3 is a sectional view of the portable machining apparatus according to the first embodiment taken along line III-III in FIG. 2 as viewed in a direction indicated by arrows.

As shown in FIGS. 3 and 4, an internal space of the raised portion 2A serves as an electric component compartment 30. As in the raised portion 2A, the electric component compartment 30 is long in the front-rear direction and short in the lateral width direction. The electric component compartment 30 has the longitudinal direction (compartment long sides 30L) aligned with the long sides 7L of the battery 7, and the lateral direction (compartment short sides 30S) aligned with the short sides 7S of the battery 7.

An upper portion of the electric component compartment 30 mainly accommodates a controller 31 that controls the operations of the electric motor 10. The controller 31 is a rectangular plate, and includes a rectangular shallow case and a control board accommodated in the case. The control board has a mount surface (the surface facing the opening of the case) insulated with resin molding. The control board in the controller 31 receives a control circuit. The control circuit is a microcomputer that transmits a control signal based on positional information about a rotor detected by a sensor board included in the electric motor 10. The control board also receives a drive circuit. The drive circuit is a field-effect transistor (FET) that switches a current flowing through the electric motor 10 in response to a control signal received from the control circuit. The control board further receives an automatic stop circuit. The automatic stop circuit cuts power supply to the electric motor 10 to prevent overdischarge or overcharge in accordance with the detected status of the battery 7.

As shown in FIGS. 3, 4, and 6 to 8, the controller 31 accommodates the control board with the mount surface facing down. Thus, electric components including a capacitor 31a, leads 31b, and connectors 31c mounted on the control board extend downward from the case. More specifically, as shown in FIG. 8, the leads 31b such as three electric wires connected to the controller 31 are routed in the front-rear direction while being bent downward into loops. Along a path laterally extending through a space between the controller 31 and the leads 31b bent into loops, various electric components including a gearshift unit 33, a wireless communication unit 34, and an internal support 35 (described below) are accommodated. The capacitor 31a is, for example, cylindrical. The capacitor 31a is mounted on the control board with the longitudinal direction aligned with the lower surface of the controller 31. The capacitor 31a extends with its longitudinal direction aligned with the lateral direction at a frontward position of the electric component compartment 30 and behind an activation switch 32.

FIGS. 3 and 4 show the electric component compartment 30 in detail. The electric component compartment 30 accommodates the activation switch 32 for activation and deactivation, the gearshift unit 33 for changing the speed, and the wireless communication unit 34 for performing wireless communication. The activation switch 32 (third electric component) is accommodated in the front portion of the electric component compartment 30. The gearshift unit 33 is accommodated at the right of the electric component compartment 30. The wireless communication unit 34 is accommodated at the left of the electric component compartment 30.

The activation switch 32, the gearshift unit 33, and the wireless communication unit 34 are accommodated below the controller 31 and above the electric motor 10. The activation switch 32, the gearshift unit 33, and the wireless communication unit 34 are accommodated at substantially the same height in an imaginary plane S perpendicular to the motor axis J.

The activation switch 32 (third electric component) is held by a first frame 2Aa. The first frame 2Aa is located on a front surface of the raised portion 2A, and is an ellipse elongated laterally. The activation switch 32 includes an operation part 32a and a board 32e. The operation part 32a is exposed on the front surface of the raised portion 2A. The operation part 32a includes an activation button 32b and a stand-by button 32c. Pressing the activation button 32b with the battery 7 attached to the battery mount 21 activates the electric motor 10 and rotates the tip tool 15 about the motor axis J. Pressing the activated activation button 32b deactivates the electric motor 10. Turning on the stand-by button 32c locks the activation button 32b. Pressing the locked activation button 32b cannot activate the electric motor 10. This prevents accidental activation. Pressing the stand-by button 32c with the activation button 32b locked unlocks the activation button 32b. Pressing the unlocked activation button 32b activates the electric motor 10.

As shown in FIGS. 3 and 8, the board 32e is held at the rear of the operation part 32a. Operation signals from the activation switch 32 are input into the controller 31 through the board 32e. Thus, the controller 31 controls the operations of the electric motor 10 including activation and deactivation.

As shown in FIGS. 4, 6, and 7, the gearshift unit 33 (first electric component) includes an operation part 33a. The operation part 33a is rotated to change the rotational speed of the electric motor 10. The operation part 33a is rotatably supported by a base portion 33b (body). The operation part 33a is disk-shaped. The operation part 33a is rotatably supported about a vertical axis. The gearshift unit 33 is held by a second frame 2Ab. The second frame 2Ab is located at the right of the raised portion 2A (right raised portion 2RA). The second frame 2Ab is a rectangular frame protruding leftward from the inside of the right raised portion 2RA. A right portion of the operation part 33a is exposed outside through a window 2Ac in the second frame 2Ab. The user can rotate the operation part 33a in the front-rear direction by applying a fingertip on the portion exposed through the window 2Ac. The amount by which the operation part 33a is rotated is input into the controller 31 through the base portion 33b. Thus, the rotational speed of the electric motor 10 is controlled.

As shown in FIGS. 4, 6, 7, and 9, a left portion of the electric component compartment 30 accommodates the wireless communication unit 34 (second electric component). The wireless communication unit 34 includes a wireless communication adaptor 34a, an adaptor receiver 34b, and a resin cap 34c. The wireless communication adaptor 34a is connected to the adaptor receiver 34b. The wireless communication adaptor 34a transmits radio waves indicating the activation or deactivation status of the electric motor 10. The adaptor receiver 34b is held in an inner portion of a third frame 2Ad. The third frame 2Ad is located at the left of the raised portion 2A (left raised portion 2LA). The third frame 2Ad is a rectangular frame protruding rightward from the inside of the left raised portion 2LA. The third frame 2Ad is open outward through an opening 2Ae. The wireless communication adaptor 34a is received by the adaptor receiver 34b to be mechanically joined and electrically connected to the adaptor receiver 34b. The wireless communication adaptor 34a is removably attached to the adaptor receiver 34b.

The wireless communication adaptor 34a is pulled out from the adaptor receiver 34b to be removed from the adaptor receiver 34b. The wireless communication adaptor 34a removed from the adaptor receiver 34b is removable from the third frame 2Ad through the opening 2Ae. The removed wireless communication adaptor 34a can be pushed into the third frame 2Ad through the opening 2Ae and attached to the adaptor receiver 34b.

The opening 2Ae of the third frame 2Ad is closed with the cap 34c. The cap 34c is pushed into the opening 2Ae with a small force to be held in a closed state. The closed cap 34c is held substantially flush with the outer surface of the raised portion 2A to be a part of a side wall of the raised portion 2A.

Figure 9:
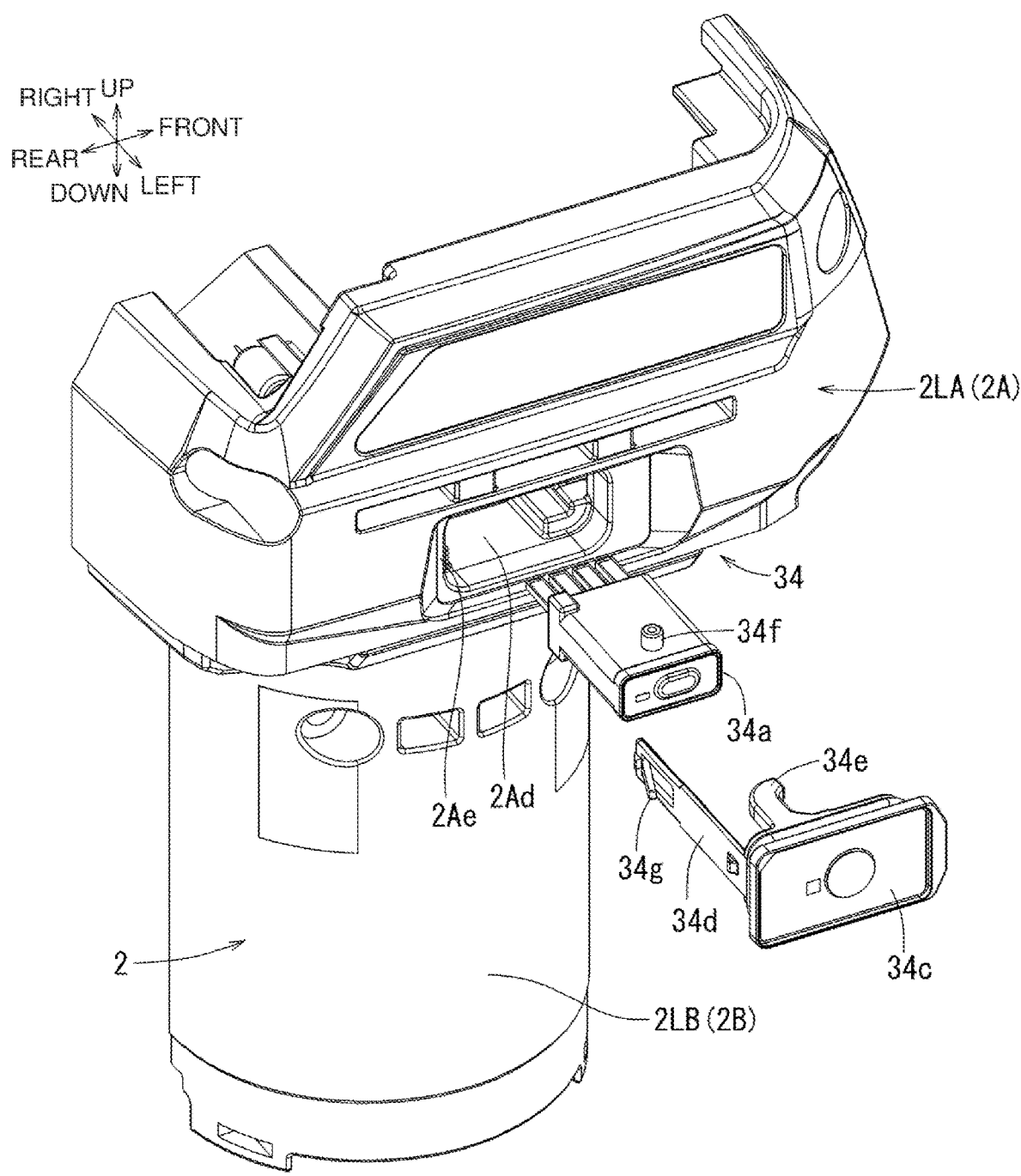
FIG. 9 is an exploded perspective view of the portable machining apparatus according to the first embodiment with a cap separated and a second electric component removed.
Figure 10:
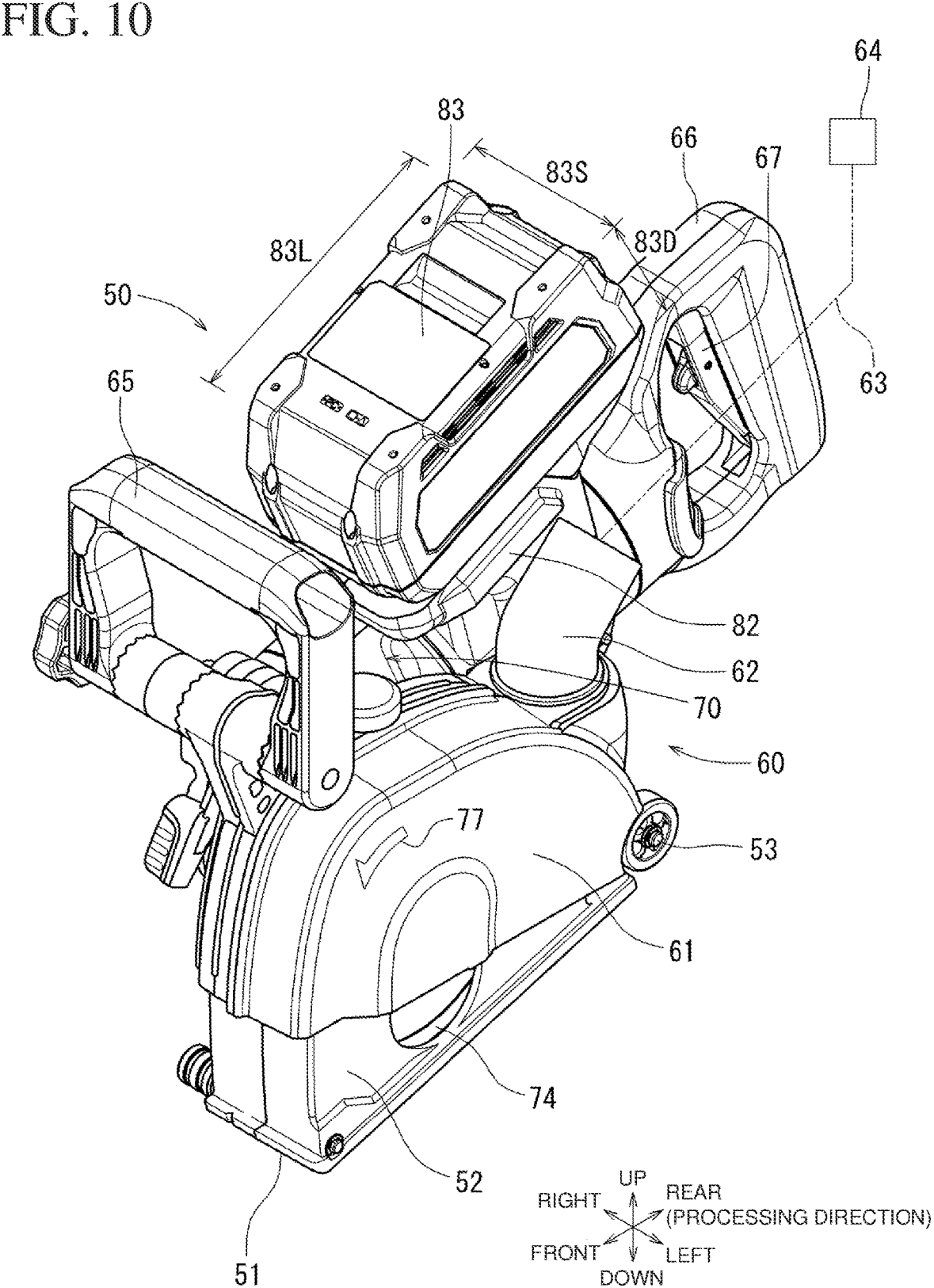
FIG. 10 is an overall perspective view of a portable machining apparatus according to a second embodiment in an initial state in which a machining apparatus body is at an uppermost end position.

As shown in FIG. 9, a holding arm 34d and an engagement arm 34e are integral with the cap 34c. The holding arm 34d is elongated from the rear end of the cap 34c toward the inner portion of the third frame 2Ad. An engagement protrusion 34g is integral with the distal end of the holding arm 34d. The engagement protrusion 34g is engaged with an inner wall of the third frame 2Ad to be laterally displaceable. Thus, the cap 34c is prevented from being removed from the third frame 2Ad while being allowed to move toward or away from the opening 2Ae. When the engagement protrusion 34g is removed from the third frame 2Ad while being elastically deformed, the cap 34c can be separated from the third frame 2Ad. FIG. 9 shows the cap 34c being separated (disassembled).

The engagement arm 34e is integral with substantially the center of the inner surface of the cap 34c. The engagement arm 34e protrudes inward from the third frame 2Ad. The engagement arm 34e has the protruding distal end curved into a hook. The distal-end hook in the engagement arm 34e is hooked on an engagement portion 34f at the side of the wireless communication adaptor 34a. While allowing the engagement arm 34e in the cap 34c to be hooked on the engagement portion 34f, the wireless communication adaptor 34a is attached to the adaptor receiver 34b. Thus, when the cap 34c is pulled to open the opening 2Ae and then moved away from the opening 2Ae, the wireless communication adaptor 34a is pulled out together for removal. The wireless communication adaptor 34a pulled out with the cap 34c is separated from the cap 34c. The removed wireless communication adaptor 34a is usable for another device. The cap 34c can close the empty third frame 2Ad with the wireless communication adaptor 34a being removed.

As shown in FIGS. 4 and 6 to 8, the gearshift unit 33 and the wireless communication unit 34 are positioned relative to each other with the internal support 35. The internal support 35 is an integral piece of a molded resin that is a rectangular prism laterally long and almost flat. The internal support 35 includes a first wall 35a integral with the internal support 35 on its right side (first side). The first wall 35a is a rectangular frame with walls on four sides at the front, the rear, the top, and the bottom. The first wall 35a extends rightward, and is open rightward. The internal support 35 includes a second wall 35b integral with the internal support 35 on its left side (second side). The second wall 35b is a rectangular frame with walls on four sides at the front, the rear, the top, and the bottom. The second wall 35b extends leftward, and is open leftward. The second wall 35b is a rectangular frame that is slightly larger than the first wall 35a. Thus, a stepped portion 35c is located between the first and second walls 35a and 35b. The second wall 35b has a recess deeper than the first wall 35a.

The base portion 33b of the gearshift unit 33 is joined inside the first wall 35a (first positioner). The first wall 35a functions as an enclosure to hold the gearshift unit 33. The first wall 35a in this state is elastically placed in the second frame 2Ab to be held in position. Thus, the internal support 35 is held in position with respect to the second frame 2Ab.

The adaptor receiver 34b in the wireless communication unit 34 is placed in and held by the second wall 35b (second positioner). The second wall 35b functions as an enclosure to removably hold the wireless communication adaptor 34a in the wireless communication unit 34 with the adaptor receiver 34b in between. As shown in FIG. 4, the adaptor receiver 34b is placed also in the third frame 2Ad. The adaptor receiver 34b is thus held across both the inner periphery of the second wall 35b of the internal support 35 and the inner periphery of the third frame 2Ad. Thus, the internal support 35 is held in position with respect to the third frame 2Ad with the adaptor receiver 34b in between.

The internal support 35 simplifies the attachment of various electric components including the gearshift unit 33 and the wireless communication unit 34 to the electric component compartment 30. For example, the gearshift unit 33 and the first wall 35a in the internal support 35 are attached to the second frame 2Ab in the right half 2L. The wireless communication unit 34 is attached to the third frame 2Ad in the left half 2L. Thereafter, the right and left halves 2R and 2L are in contact with each other while the adaptor receiver 34b is being placed in the second wall 35b in the internal support 35. Thus, with five components including the right half 2R, the gearshift unit 33, the internal support 35, the wireless communication unit 34, and the left half 2L being assembled together, the right and left halves 2R and 2L are fastened with screws. This completes the assembly. Through this assembly, the gearshift unit 33 and the wireless communication unit 34 are laterally aligned along the common imaginary plane S perpendicular to the motor axis J and are positioned with the internal support 35.

The lengths of the first and second walls 35a and 35b in the lateral direction are set as appropriate. As shown in FIG. 4, when the electric component compartment 30 is assembled, a slight gap V1 is left between the stepped portion 35c and the left end of the second frame 2Ab, and a slight gap V2 is left between the left end of the second wall 35b and the right end of the third frame 2Ad.

The dimension of the second wall 35b in the lateral direction is set as appropriate with respect to a gap between the left end of the second frame 2Ab and the right end of the third frame 2Ad to leave the gap V1 or V2 in the assembled electric component compartment 30. Thus, the gearshift unit 33 and the wireless communication unit 34 are assembled together without receiving an external force in the lateral direction.

In the present embodiment, the battery 7 that is a rectangular prism with the long sides 7L and the short sides 7S is attached to the battery mount 21. The battery 7 is attached with its long sides 7L aligned in the front-rear direction and its short sides 7S aligned in the lateral direction. Thus, the battery 7 is attached in the lateral direction in a space-saving manner. The electric component compartment 30 includes the compartment long sides 30L aligned with the long sides 7L of the battery 7, and the compartment short sides 30S aligned with the short sides 7S of the battery 7. The gearshift unit 33 (first electric component) and the wireless communication unit 34 (second electric component) are aligned along the compartment short sides 30S. Thus, a space for accommodating electric components including, for example, the leads 31b and the connector 31c is left in front of or behind the gearshift unit 33 and the wireless communication unit 34.

The operation part 33a in the gearshift unit 33 in the present embodiment protrudes outward through the window 2Ac in the raised portion 2A. Thus, the gearshift unit 33 is compact while the operation part 33a is retained rotationally operable.

In the present embodiment, the wireless communication adaptor 34a is removably installed in the electric component compartment 30 through the opening 2Ae in the raised portion 2A. The cap 34c closing the opening 2Ae and forming a part of the side wall in the raised portion 2A is removably attached to the raised portion 2A. Thus, the components around the opening 2Ae are positioned in a space-saving manner.

The gearshift unit 33 and the wireless communication unit 34 in the present embodiment are aligned in the direction (lateral direction) in which the wireless communication adaptor 34a is attached to or removed from the electric component compartment 30. Thus, the operability in attaching and removing the wireless communication adaptor 34a is not decreased by other electric components including the leads 31b in the controller 31.

The gearshift unit 33 and the wireless communication unit 34 in the present embodiment are positioned relative to each other with the internal support 35. Thus, the gearshift unit 33 and the wireless communication unit 34 are positioned in a space-saving manner in the electric component compartment 30.

The internal support 35 in the present embodiment includes the first positioner for positioning the gearshift unit 33 on the right side (first side) and the second positioner for positioning the wireless communication unit 34 on the left side (second side). Thus, the gearshift unit 33 and the wireless communication unit 34 are positioned relative to each other to be aligned in the longitudinal direction of the internal support 35.

The internal support 35 includes the second wall 35b (enclosure) serving as the second positioner. The wireless communication adaptor 34a is removably placed inside the second wall 35b (enclosure) with the adaptor receiver 34b in between. Thus, the wireless communication unit 34 may be appropriately attached to the electric component compartment 30. In addition, the adaptor receiver 34b may be appropriately attached to the internal support 35.

The controller 31 in the present embodiment has the mount surface for receiving circuit components facing downward toward the electric component compartment 30. Thus, the circuit components including the capacitor 31a, the leads 31b, and the connector 31c are arranged in a space-saving manner on the gearshift unit 33 and the wireless communication unit 34.

In the present embodiment, the window 6d to allow visual observation of a processing target portion is located in the front surface of the base attachment 6 joined to the housing 2. With respect to the window 6d in the front surface, the gearshift unit 33 is located at the right of the raised portion 2A (right raised portion 2RA), and the wireless communication unit 34 is located at the left of the raised portion 2A (left raised portion 21A). Thus, the gearshift unit 33 and the wireless communication unit 34 are appropriately operable.

In the present embodiment, the activation switch 32 is located on the front surface of the raised portion 2A. The gearshift unit 33, the wireless communication unit 34, and the activation switch 32 are aligned in the imaginary plane S perpendicular to the motor axis J. Thus, the gearshift unit 33, the wireless communication unit 34, and the activation switch 32 are arranged in a space-saving manner in the height direction of the electric component compartment 30.

In the present embodiment, the gearshift unit 33 changes the rotational speed of the electric motor 10 in accordance with the processing mode to efficiently perform high-quality processing operation. In addition, the wireless communication unit 34 can operate in cooperation with an external device such as a dust collector in accordance with the start or stop of the portable machining apparatus 1. Thus, the portable machining apparatus 1 increases the operability and the workability. When removed, the wireless communication adaptor 34a is usable as a wireless communication adaptor for another device as well.

The present embodiment may be modified in various manners. For example, the battery 7 is attached to or removed from the battery mount 21 in the front-rear direction (slide direction), but may be attached or removed by sliding the battery 7 in the lateral direction. The battery 7 is attached to or removed from the battery mount 21 by sliding the battery 7 along the long sides 7L, but may be attached or removed by sliding the battery 7 along the short sides 7S.

The gearshift unit 33 is an example of the first electric component, the wireless communication unit 34 is an example of the second electric component, and the activation switch 32 is an example of the third electric component, but these electric components may be other electric components. The gearshift unit 33 is located at the right, and the wireless communication unit 34 is located at the left, but their positions may be interchangeable.

The gearshift unit 33 and the wireless communication unit 34 are arranged on opposite sides with respect to the window 6d used as the front surface to allow visual observation of the processing target portion, but another component or structure may be used as a reference to define the front surface. Thus, the gearshift unit 33 and the wireless communication unit 34 may be arranged on the front and rear surfaces. The gearshift unit 33 (first electric component) and the wireless communication adaptor 34a (second electric component) accommodated at the same height along the common imaginary plane S and arranged on opposite surfaces of the raised portion 2A produce the same effects.

For example, the activation switch 32 is located on the front surface of the raised portion 2A, but may be located on the upper or rear surface of the raised portion 2A. The activation switch 32 may be located at the height not in the imaginary plane S.

For example, both the first wall 35a (first end) and the second wall 35b (second end) of the internal support 35 are a rectangular frame (enclosure), but one of the walls alone may be a rectangular frame. Thus, the enclosure of the second wall 35b may have another shape.

Instead of being the rectangular frame in an example, the first and second walls 35a and 35b may each be, for example, an insertion protrusion. The first end or the second end of the internal support 35 or both ends may be placed in a positioning hole in the first or second electric component or in both the components to position both electric components relative to each other. The internal support 35 may be eliminated.

A laminate trimmer holdable with one hand and moved to perform light cutting operations is an example of the portable machining apparatus 1. In some embodiments, the arrangement of electric components in an example is also applicable to a router held with both hands and moved for heavy cutting operations. In addition, the arrangement of electric components in an example is also applicable to a portable machining apparatus including neither the base 5 nor the base attachment 6 being in contact with the workpiece W Instead of being a cutting blade, the tip tool 15 may be, for example, a disk-shaped mop (pad) or a sanding disc (grindstone). The present disclosure is thus also applicable to a polisher or a sander.

The cylinder 2B and the raised portion 2A in the present embodiment are examples of the housing. The gearshift unit 33 in the present embodiment is an example of the first electric component. The wireless communication adaptor 34a in the present embodiment is an example of the second electric component. The imaginary plane S in the present embodiment is an example of the same plane.

The base 5 in the present embodiment is an example of the contact portion. The workpiece W in the present embodiment is an example of the contact portion. The dust collector in the present embodiment is an example of the external device.

Second Embodiment

FIGS. 10 to 13 show a stonework portable cutting tool called a double groove cutter or a wall chaser as an example of a portable machining apparatus 50 according to a second embodiment. The portable machining apparatus 50 cuts two grooves at a time. The portable machining apparatus 50 includes a base 51 and a machining apparatus body 60. The base 51 is rectangular and flat, and is in contact with a workpiece W The machining apparatus body 60 is supported on the upper surface of the base 51. The workpiece W is a wall mainly formed from concrete or stone.

A stationary cover 52 is supported on the upper surface of the base 51. The machining apparatus body 60 is supported by a body support shaft 53 in a vertically swingable manner at the rear of the stationary cover 52. The machining apparatus body 60 includes a semi-cylindrical movable cover 61. The movable cover 61 has its rear joined to the rear of the stationary cover 52 with the body support shaft 53.

Figure 11:
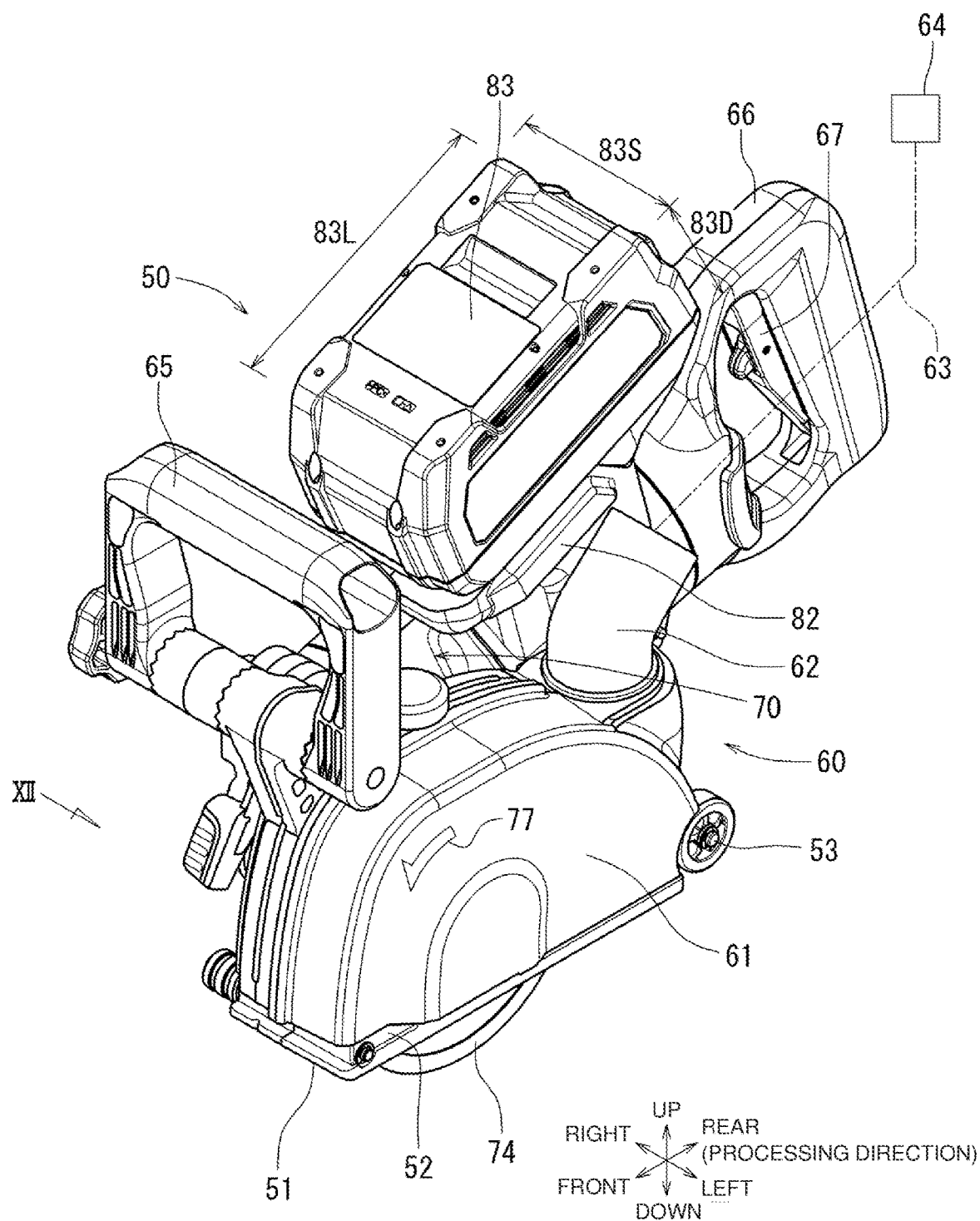
FIG. 11 is an overall perspective view of the portable machining apparatus according to the second embodiment with the machining apparatus body pushed down to a lowermost end position.

The stationary cover 52 is accommodated in the movable cover 61 in a manner movable forward or backward relative to each other. The movable cover 61 is urged by a spring in a direction away from the base 51 (upward). As shown in FIG. 11, grooving is performed when the movable cover 61 is pushed down by the user against the spring force.

A dust collector duct 62 is located at the rear of the movable cover 61. A dust collector 64 is connectable to the dust collector duct 62 through a hose 63. Chips resulting from the grooving are efficiently collected by the dust collector 64. The dust collector 64 may be replaced by a dust bag (not shown) connected to the dust collector duct 62.

Figure 14:
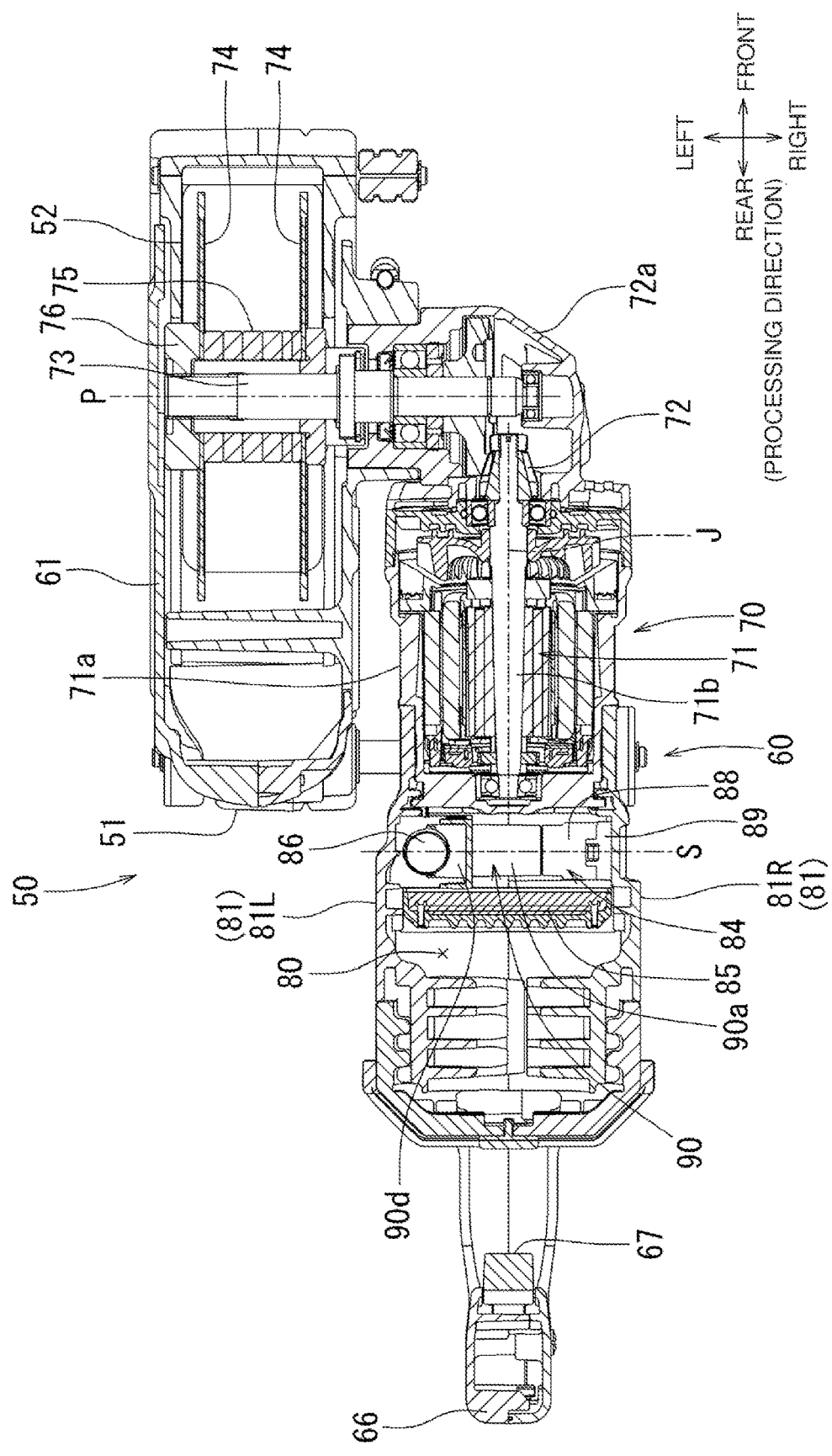
FIG. 14 is a horizontal sectional view of the portable machining apparatus according to the second embodiment taken along line XIV-XIV in FIG. 12 as viewed in a direction indicated by arrows.
Figure 15:
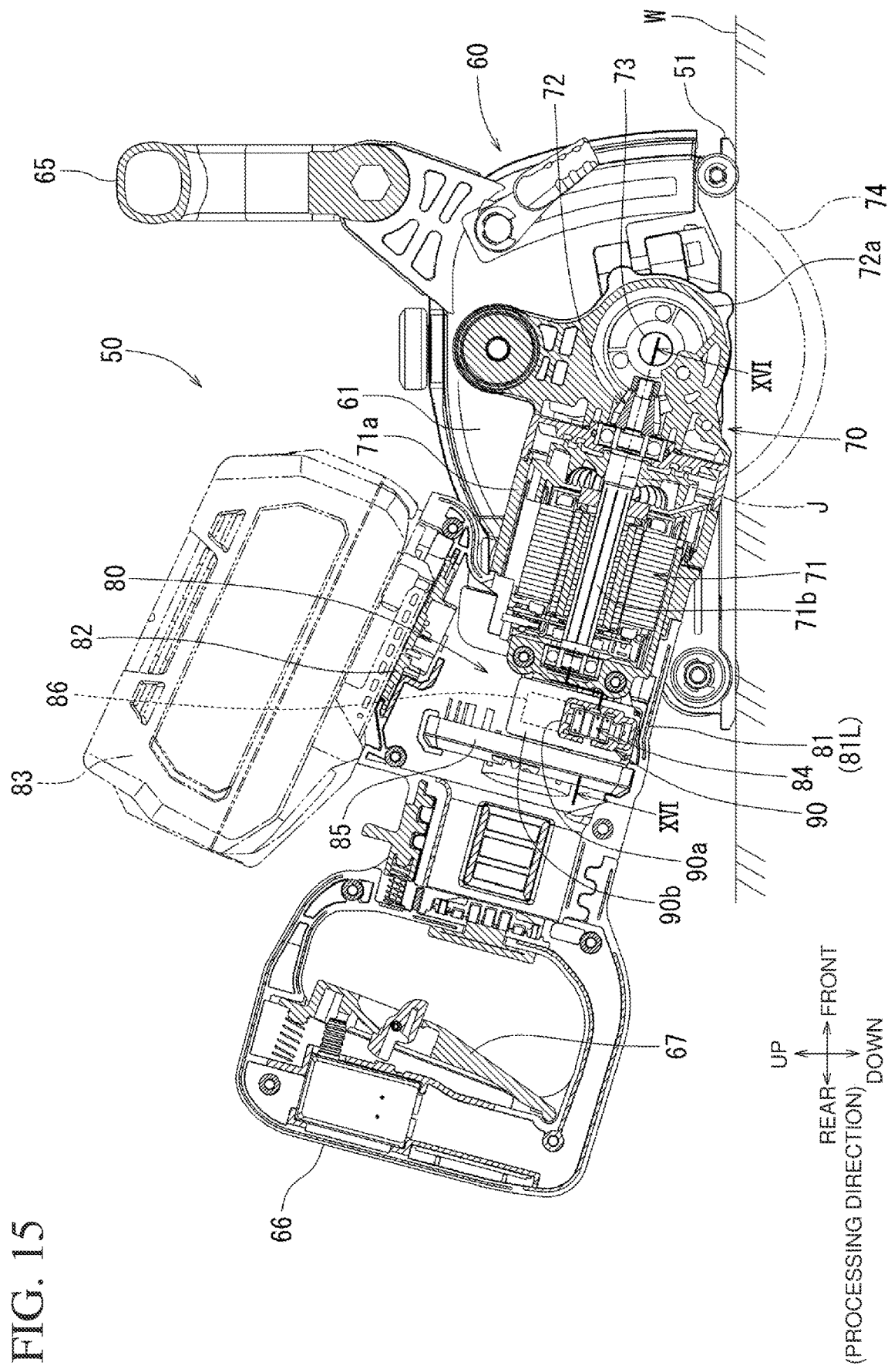
FIG. 15 is a longitudinal sectional view of the portable machining apparatus according to the second embodiment taken along line XV-XV in FIG. 13 as viewed in a direction indicated by arrows.
Figure 16:
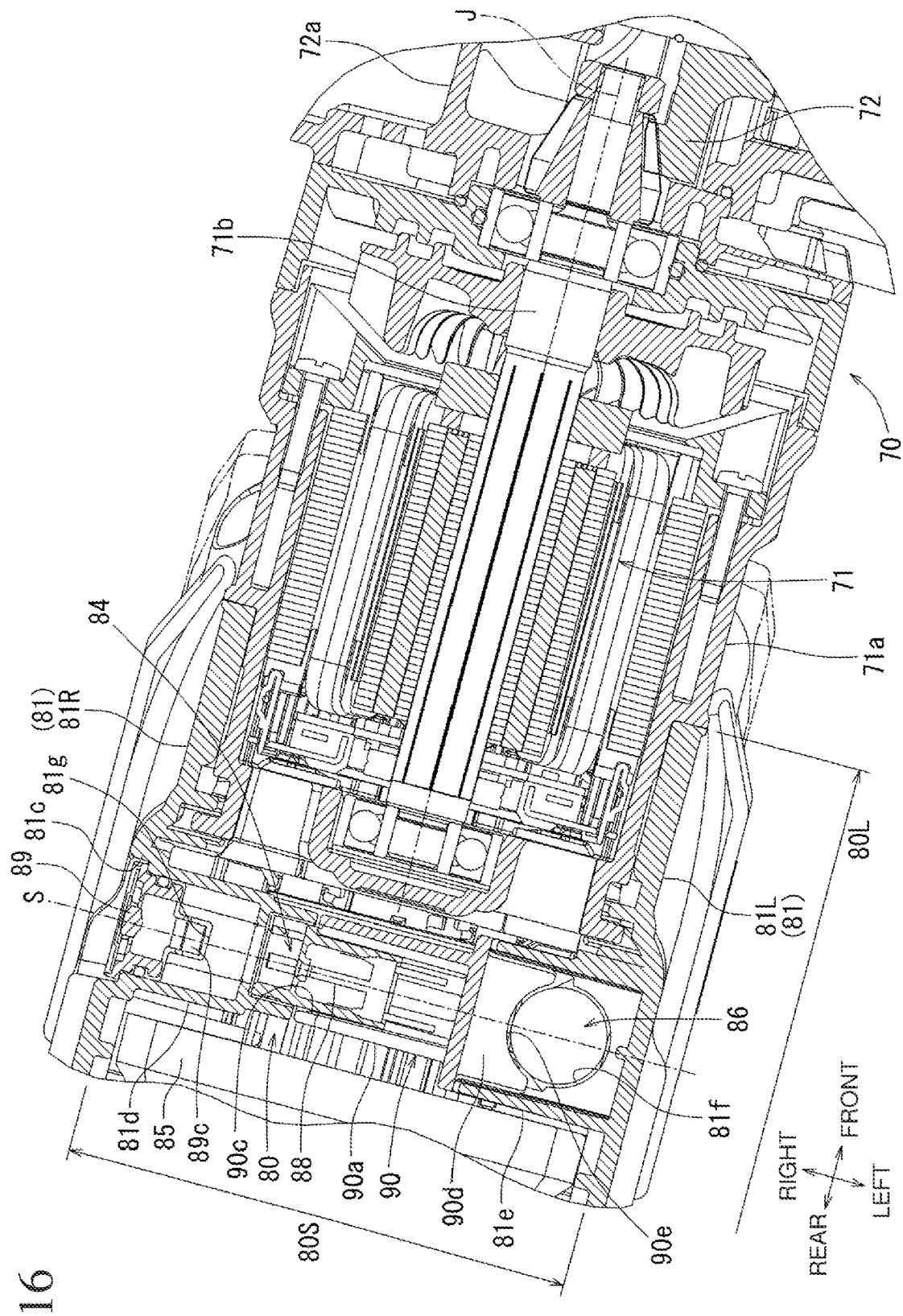
FIG. 16 is a sectional view of a drive taken along line XVI-XVI in FIG. 15 as viewed in a direction indicated by arrows.

A drive 70 is joined at the right of the movable cover 61. As shown in FIGS. 14, 15, and 16, the drive 70 includes an electric motor 71, a deceleration gear 72, and an output shaft 73. The electric motor 71 is accommodated in a motor housing 71a. The deceleration gear 72 is accommodated in a gear housing 72a. Rotation from the electric motor 71 is output to the output shaft 73 through the deceleration gear 72. The output shaft 73 is rotatably supported about an output axis P perpendicular to the axis of a motor shaft 71*b* (motor axis J).

The output shaft 73 protrudes inward from the movable cover 61. Inside the movable cover 61, two disk-shaped tool (tip tool 74) are coaxially attached to the output shaft 73. The two tip tools 74 have the same diameter. The two tip tools 74 are, for example, diamond wheels. The distance between the two tip tools 74 may be set as appropriate by changing the number or the size of spacers 75. The two tip tools 74 are fastened to the output shaft 73 by tightening a fastening nut 76.

Figure 12:
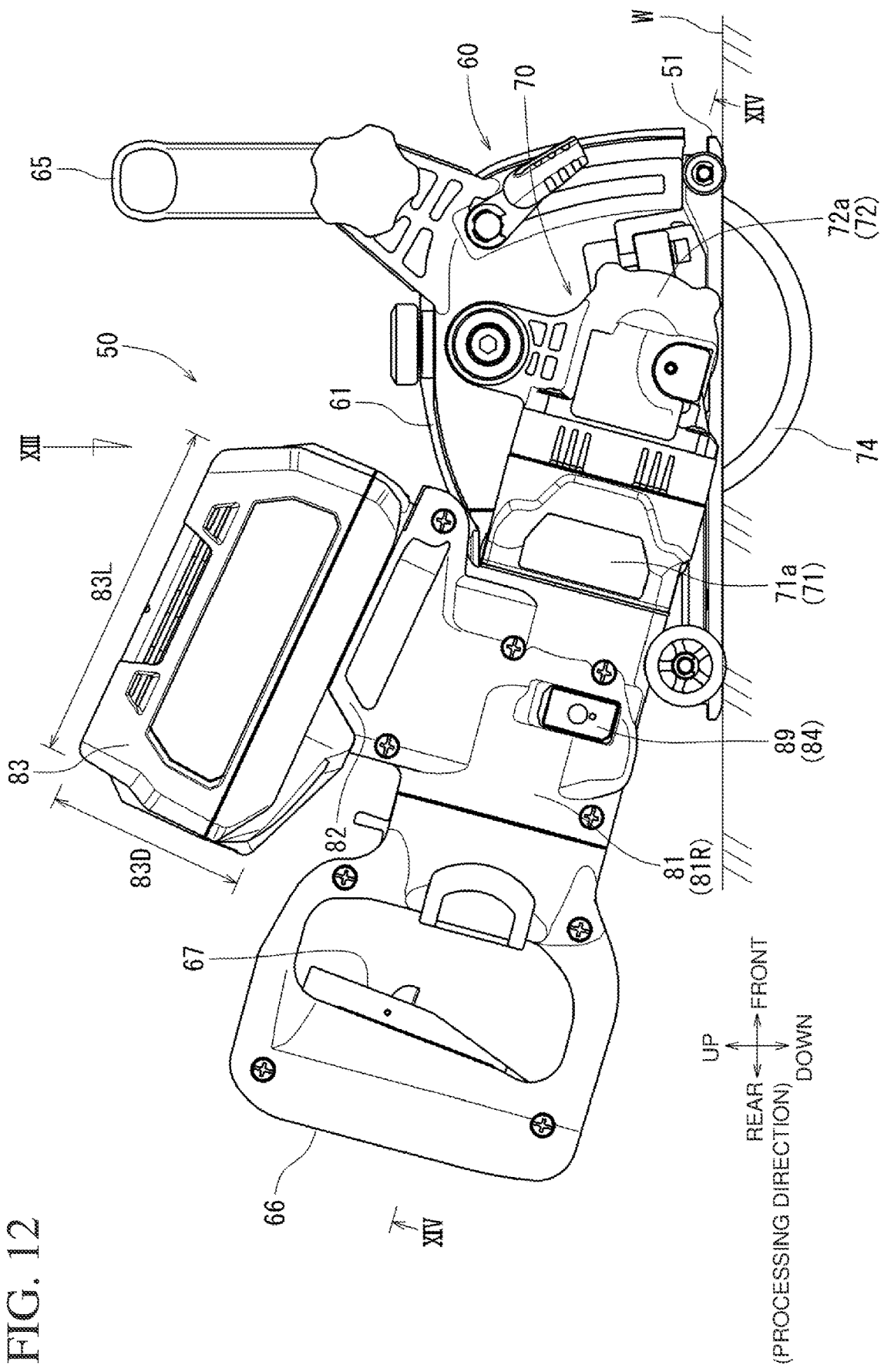
FIG. 12 is a right side view of the portable machining apparatus according to the second embodiment as viewed in the direction indicated by arrow XII in FIG. 11.
Figure 13:
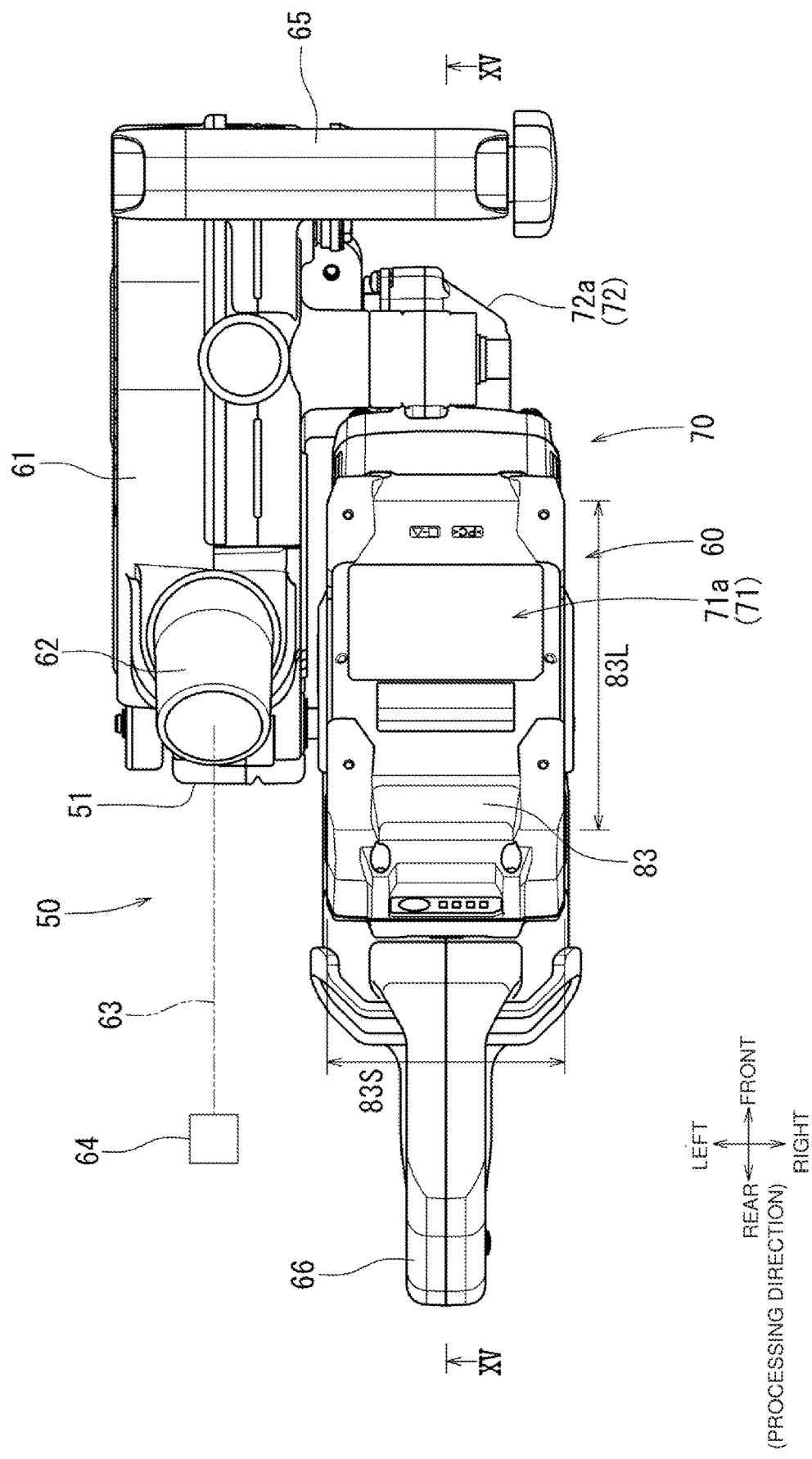
FIG. 13 is a plan view of the portable machining apparatus according to the second embodiment as viewed in the direction indicated by arrow XIII in FIG. 12.

As shown in FIGS. 11, 12, and 15, when the user pushes down the movable cover 61, lower portions of the two tip tools 74 are exposed from the lower surface of the base 51. The exposed tip tools 74 cut into the workpiece W. When the portable machining apparatus 50 is moved, for example, backward (leftward in FIG. 12) in a plane direction of the workpiece W with the tip tools 74 being cut into the workpiece W, two grooves are cut.

A portal front handle 65 is supported at the front of the movable cover 61. The front handle 65 extends in the lateral direction. When in use, the front handle 65 is translational in the front-rear direction to adjust its position. The user holds the front handle 65 with, for example, the left hand and pushes down the movable cover 61 for operation.

A cylindrical body housing 81 is joined at the rear of the motor housing 71*a*. The body housing 81 is dividable into left and right halves. A left half and a right half 81R are in contact with each other to form the body housing 81.

A battery mount 82 is located at the top of the body housing 81. One battery 83 is removably attached to the battery mount 82. Power from the battery 83 attached is supplied to the electric motor 71. The battery 83 is, for example, a lithium-ion battery attachable in a slidable manner. The battery 83 is a rectangular prism with long sides 83L, short sides 83S, and thickness sides 83D. As in the first embodiment, the battery 83 with the short sides 83S perpendicular to the motor axis J is attached to the battery mount 82. The battery 83 is removable from the battery mount 82 and rechargeable with a separately prepared recharger for repeated use.

A loop-shaped rear handle 66 is supported at the rear of the body housing 81. A switch lever 67 is located on an inner peripheral of the rear handle 66. Pulling the switch lever 67 with a fingertip of the hand holding the rear handle 66 activates the electric motor 71 and rotates the two tip tools 74. The rear handle 66 has its position changeable about the axis parallel to the motor axis J.

For example, the user holds the rear handle 66 with the right hand, and holds the front handle 65 with the left hand to move and operate the portable machining apparatus 50. An arrow 77 on the left side of the movable cover 61 indicates the rotation direction of the tip tools 74. The two tip tools 74 rotate counterclockwise when viewed from the left of the movable cover 61. Grooving is performed while rotating the two tip tools 74 in the direction of the arrow 77 and moving the portable machining apparatus 50 rightward (backward) as viewed from the user. In the second embodiment, the direction in which grooving is performed (toward the user) is defined as backward. The lateral direction is defined with reference to the user facing frontward at the rear of the portable machining apparatus 50. Some double groove cutters (wall chasers) include blades that rotate in the opposite direction, and thus perform processing in the direction away from the user (forward). In this case as well, a position nearer the user is defined as the rear.

As shown in FIGS. 14 to 18, an electric component compartment 80 is located inside the body housing 81. The electric component compartment 80 is located below the battery mount 82. The electric component compartment 80 has compartment long sides 80L and compartment short sides 80S. The compartment long sides SOL are parallel to the long sides 831, of the battery 83 attached to the battery mount 82. The compartment short sides 80S are parallel to the short sides 83S of the battery 83. The compartment long sides 80L are aligned with the front-rear direction (the direction of the motor axis J). The compartment short sides 80S are aligned with the lateral direction. The electric component compartment 80 is a space long in the front-rear direction substantially parallel to the longitudinal direction (the direction of the long sides 83L) of the battery 83 and short in the lateral direction.

The electric component compartment 80 accommodates a rectangular flat controller 85, and first and second electric components. The controller 85 includes a shallow case and a control board accommodated in the case, and is insulated with resin molding. The controller 85 is accommodated with the plane direction aligned with the direction of the compartment short sides 80S. The controller 85 is accommodated in the electric component compartment 80 with the mount surface of the control board facing frontward. As in the first embodiment, multiple leads (not shown) are routed from the mount surface of the control board. Electric components including leads and a connector are routed through the electric component compartment 80. The controller 85 controls the operation of the electric motor 71.

Figure 17:
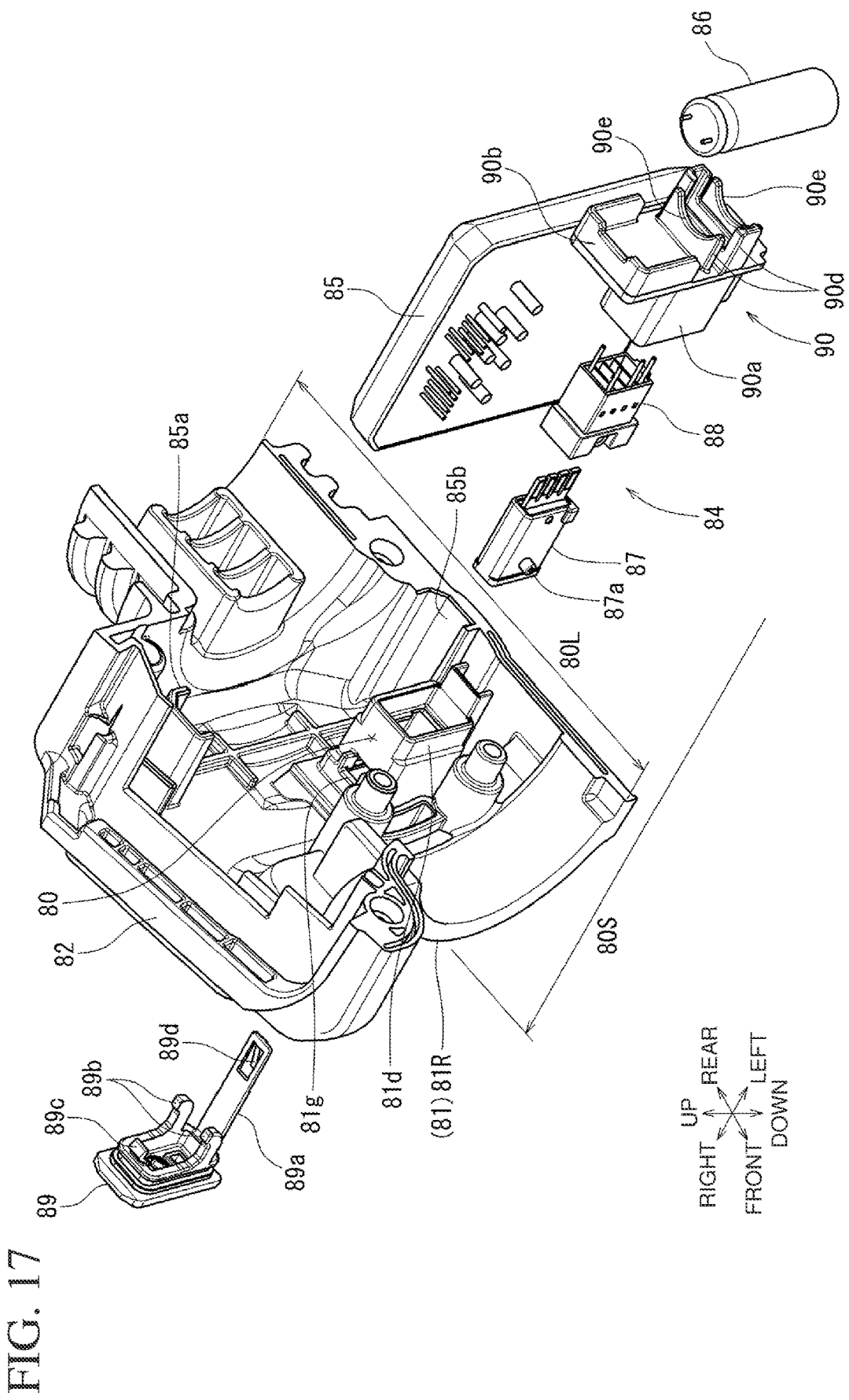
FIG. 17 is an exploded perspective view of a right housing half of an electric component compartment in the second embodiment.
Figure 18:
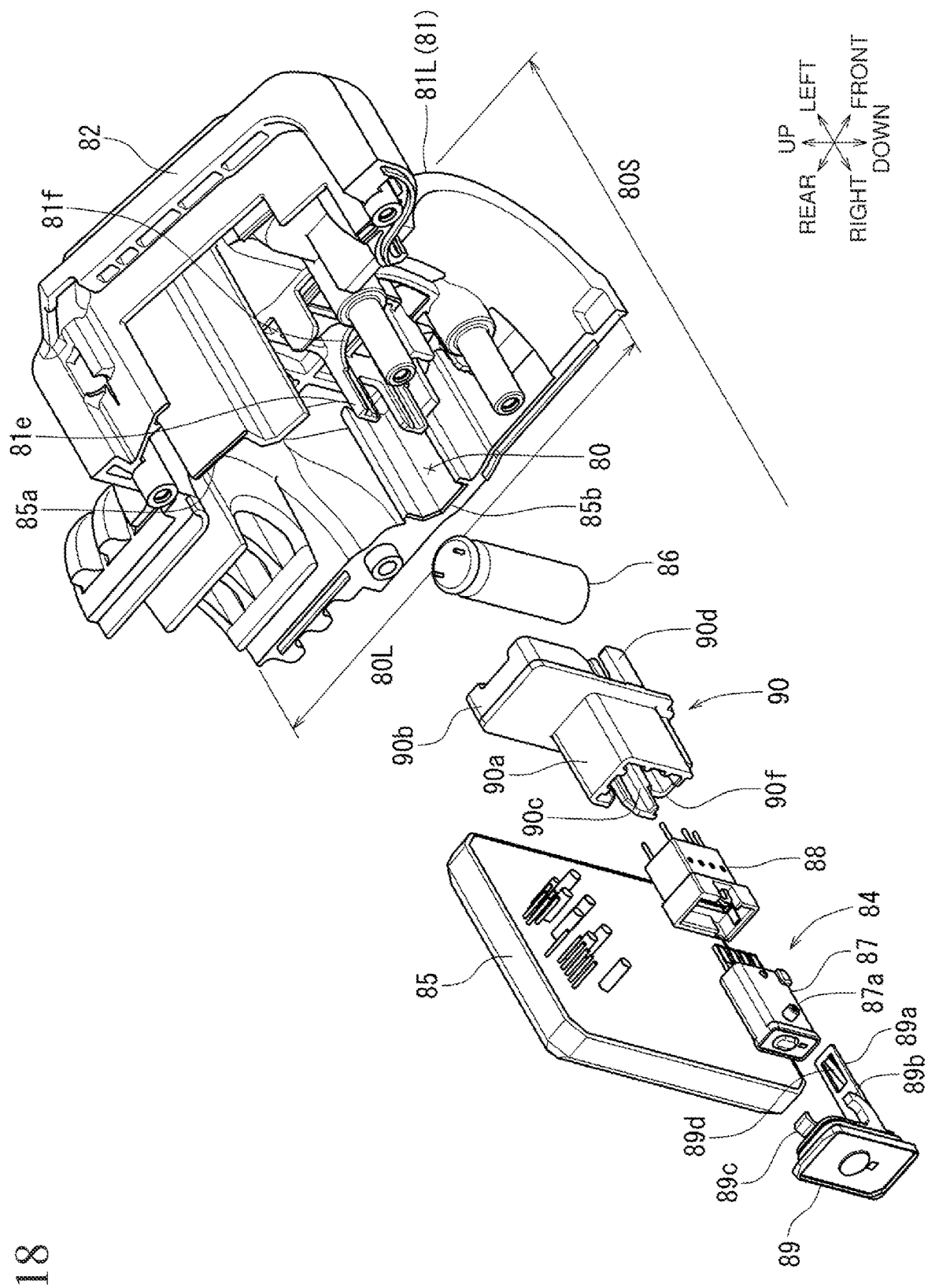
FIG. 18 is an exploded perspective view of a left housing half of the electric component compartment in the second embodiment.

As shown in FIGS. 17 and 18, the controller 85 is held in the electric component compartment 80 and between upper and lower holding frames 85*a* and 85*b* inside the body housing 81. When the left halve 81L and the right halve 81R in the body housing 81 are joined to each other, the controller 85 is laterally positioned in the electric component compartment 80 and is attached.

The first and second electric components are accommodated in front of the controller 85. An example of the first electric component is a cylindrical capacitor 86. An example of the second electric component is a wireless communication unit 84 for performing wireless communication. The capacitor 86 is connected to the control hoard in the controller 85 through leads (not shown). The accommodated capacitor 86 vertically extends along the left side of the controller 85.

The wireless communication unit 84 includes a wireless communication adaptor 87, an adaptor receiver 88, and a cap 89. The wireless communication adaptor 87 transmits, to an external device (dust collector 64), signals indicating the activation and deactivation status of the electric motor 71 or the operation state of the switch lever 67. FIG. 16 shows the structure with the wireless communication adaptor 87 being removed.

The wireless communication adaptor 87 is accommodated in the electric component compartment 80 through an adaptor slot 81*c*, as shown in FIG. 16, located at the right of the body housing 81 (right half 81R). The wireless communication adaptor 87 is placed in the adaptor receiver 88 positioned in the electric component compartment 80 to be attached. The adaptor slot 81*c* is closed with the resin cap 89.

A holding frame 81*d* that is a rectangular frame is integral with the adaptor slot 81*c*. The holding frame 81*d* protrudes inside the right half 81R. A right portion (including the slot) of the adaptor receiver 88 is placed in the holding frame 81*d*. This structure restricts rightward displacement of the adaptor receiver 88 (in a direction of removal of the adaptor). The wireless communication adaptor 87 is placed in the adaptor receiver 88 to be mechanically joined and electrically connected to the adaptor receiver 88. The wireless communication adaptor 87 is removably attached to the adaptor receiver 88.

The wireless communication adaptor 87 is pulled out from the adaptor receiver 88 and removed from the adaptor receiver 88. The wireless communication adaptor 87 removed from the adaptor receiver 88 is removable from the holding frame 81*d* through the adaptor slot 81*c*. The removed wireless communication adaptor 87 is pushed into the holding frame 81*d* through the adaptor slot 81*c* and attachable to the adaptor receiver 88.

The cap 89 is pushed into the adaptor slot 81*c* with a small force to close the adaptor slot 81*c*. The closing cap 89 is held substantially flush with the outer surface of the body housing 81 to be a part of the side wall of the body housing 81.

As shown in FIGS. 17 and 18, the cap 89 includes one holding arm 89*a*, two engagement arms 89*b*, and one engagement tab 89*c*, which are integral with one another. The holding arm 89*a* extends from the lower end of the cap 89 toward an inner portion of the holding frame 81*d*. An engagement protrusion 89*d* is integral with the distal end of the holding arm 89*a*. The engagement protrusion 89*d* is engaged with the inner wall surface of the holding frame 81*d* to be laterally displaceable. The cap 89 is thus prevented from being slipped off through the holding frame 81*d* while being movable toward and away from the adaptor slot 81*c*. The cap 89 can be removed from the holding frame 81*d* when the engagement protrusion 89*d* is elastically deformed and removed from the holding frame 81*d*.

The two engagement arms 89*b* are integral with the inner surface of the cap 89. The engagement arms 89*b* protrude inside the holding frame 81*d*. The engagement arms 89*b* have distal ends bent into hooks. The distal-end hooks in the engagement arms 89*b* are hooked on engagement portions 87*a* at the front and the rear of the wireless communication adaptor 87. While allowing the engagement arms 89*b* in the cap 89 to be hooked on the engagement portions 87*a*, the wireless communication adaptor 87 is attached to the adaptor receiver 88. Thus, when the cap 89 is pulled to open the adaptor slot 81*c* and then moved further away from the adaptor slot 81*c*, the wireless communication adaptor 87 is pulled out together. The wireless communication adaptor 87 pulled with the cap 89 is separated from the cap 89. The removed wireless communication adaptor 87 is usable for another device. As shown in FIG. 16, the cap 89 can close the empty holding frame 81*d* with the wireless communication adaptor 87 removed. With the engagement tab 89*c* engaged with a recess 81*g* on the holding frame 81*d*, the cap 89 is in a closing state.

The capacitor 86 (first electric component) and the wireless communication adaptor 87 (second electric component) are positioned relative to each other with one internal support 90. The internal support 90 includes an enclosure 90*a* that is a rectangular frame and a flat pressure frame 90*b*. The internal support 90 is formed from a molded resin. The enclosure 90*a* and the pressure frame 90*b* are integral with each other. The pressure frame 90*b* extends vertically. The enclosure 90*a* is located in a lower portion on the right surface (second side) of the pressure frame 90*b*.

The enclosure 90*a* extends rightward and opens rightward. An opening 90*c* of the enclosure 90*a* receives and holds the adaptor receiver 88. As shown in FIG. 18, a groove 90*f* is formed in a lower portion of the enclosure 90*a*. With the adaptor receiver 88 placed in the enclosure 90*a*, the groove 90*f* is open rightward (toward the adaptor slot 81*c*).

The holding arm 89*a* in the cap 89 is placed in the groove 90*f*. Then, the engagement protrusion 89*d* is engaged with the inner wall surface of the holding frame 81*d*. The groove 90*f* allows appropriate attachment of the cap 89 to the holding frame 81*d*.

Two pressure walls 90*d* are integral with the left surface of the pressure frame 90*b*. The two pressure walls 90*d* extend leftward and are parallel to each other. Arc-shaped pressers 90*e* are located on the left ends of the two pressure walls 90*d*. The arc-shaped pressers 90*e* (restrictors) are in contact with the capacitor 86. Thus, the capacitor 86 is held along the pressure frame 90*b*. Thus, the capacitor 86 is positioned while being restricted from radial displacement.

The pressure frame 90*b* corresponds to a first positioner that positions the capacitor 86 (first electric component). The enclosure 90*a* corresponds to a second positioner that positions the wireless communication adaptor 87 (second electric component) The internal support 90 includes the first positioner, at the left side (first side), that positions the capacitor 86, and the second positioner, at the right side (second side), that positions the wireless communication adaptor 87. Thus, the second electric component is positioned in, for example, the vertical and front-rear directions. Thus, the second electric component is appropriately attached.

As shown in FIGS. 16 and 18, a holding frame 81*e* that is a rectangular frame is integral with the inner surface of the left half 81L in the body housing 81. The holding frame 81*e* faces the holding frame 81*d* in the right half 81R. An arc-shaped presser 81*f* is located on the holding frame 81*e*. The capacitor 86 is in contact with the presser 81*f*. Thus, as shown in FIG. 16, the capacitor 86 is held between the pressers 90*e* on the internal support 90 and the presser 81*f* on the holding frame 81*e* in the lateral direction.

As shown in FIG. 16, while being held between the holding frame 81*d* in the right half 81R and the holding frame 81*e* in the left half 81L in the lateral direction, the internal support 90 is held in position in the body housing 81. Thus, the capacitor 86 and the wireless communication unit 84 (wireless communication adaptor 87) are positioned in the electric component compartment 80. The capacitor 86 and the wireless communication unit 84 are positioned while being aligned in a direction in which the wireless communication adaptor 87 is attached to or removed from the electric component compartment 80 (in the lateral direction).

Three components including the capacitor 86, the wireless communication unit 84, and the internal support 90 are accommodated along the compartment short sides 80S of the electric component compartment 80 while being linearly aligned in a common imaginary plane S perpendicular to the motor axis J. The internal support 90 simplifies the attachment of the capacitor 86 and the wireless communication unit 84 to the electric component compartment 80.

In the present embodiment, the battery 83 that is a rectangular prism with the long sides 83L and the short sides 83S is attached to the battery mount 82. The battery 83 having the long sides 83L aligned with the front-rear direction and the short sides 83S aligned with the lateral direction is attached to the battery mount 82. Thus, the battery 83 is attached in the lateral direction in a space-saving manner. The electric component compartment 80 has the compartment long sides 80L aligned with the long sides 83L of the battery 83 and the compartment short sides 80S aligned with the short sides 83S of the battery 83. The capacitor 86 (first electric component) and the wireless communication adaptor 87 (second electric component) are accommodated in the electric component compartment 80 while being aligned along the compartment short sides 80S. Thus, the space accommodating electric components including, for example, leads and a connector is left at the fronts of the capacitor 86 and the wireless communication adaptor 87 or at the rear of the controller 85.

The wireless communication adaptor 87 in the present embodiment is removably placed in the electric component compartment 80 through the adaptor slot 81c. The cap 89 serving as a part of the outer shell in the body housing 81 is removably received in the adaptor slot 81c. Thus, components around the adaptor slot 81c are positioned in a space-saving manner.

The capacitor 86 and the wireless communication unit 84 in the present embodiment are aligned in the direction (lateral direction) in which the wireless communication adaptor 87 is attached to or removed from the electric component compartment 80. Thus, the operability in attaching and removing the wireless communication adaptor 87 is not decreased by other electric components including the capacitor 86 and the internal support 90.

The capacitor 86 and the wireless communication unit 84 in the present embodiment are positioned relative to each other with the internal support 90. Thus, the capacitor 86 and the wireless communication unit 84 are positioned in a space-saving manner inside the electric component compartment 80.

The internal support 90 in the present embodiment includes the first positioner, at the left side (first side), to position the capacitor 86, and the second positioner, at the right side (second side), to position the wireless communication unit 84. Thus, the capacitor 86 and the wireless communication unit 84 are positioned relative to each other while being laterally aligned with the internal support 90.

The internal support 90 includes the enclosure 90a as the second positioner. The wireless communication adaptor 87 is removably placed in the enclosure 90a through the adaptor receiver 88. Thus, the wireless communication unit 84 may be appropriately attached to the electric component compartment 80. The adaptor receiver 88 may be appropriately attached to the internal support 90.

The controller 85 in the present embodiment with the mount surface of the control board facing frontward (toward the electric motor 71) is located nearer the rear in the electric component compartment 80. Thus, electric components such as leads or a connector are efficiently arranged relative to the capacitor 86, the wireless communication unit 84, and the internal support 90.

The second embodiment may be changed further. For example, the battery 83 is attachable to or removable from the battery mount 82 in a direction (slide direction) aligned with the front-rear direction, but may be attachable or removable by sliding the battery 83 in the lateral direction. The battery 83 is attachable or removable by sliding the battery 83 along the long sides 83L, but may be attachable or removable by sliding the battery 83 along the short sides 83S. The battery 83 may be a built-in battery rechargeable while remaining attached to the battery mount 82.

The capacitor 86 is an example of the first electric component, and the wireless communication unit 84 is an example of the second electric component, but other electric components may be used for these electric components. The capacitor 86 is positioned at the left of the internal support 90, and the wireless communication unit 84 is positioned at the right of the internal support 90, but their positions may be interchangeable.

The double groove cutter is in an example of the portable machining apparatus 50 in the second embodiment, but the electric component compartment 80 and the internal support 90 may be used for, for example, a portable circular saw with a single circular blade.

In the first and second embodiments, the direction in which the long sides 7L or 83L of the battery 7 or 83 extend is aligned with the direction in which the compartment long sides 30L or 80L of the electric component compartment 30 or 80 extend. In some embodiments, the direction in which the short sides 7S or 83S of the battery 7 or 83 extend may be aligned with the longitudinal direction of the electric component compartment.

In the first or second embodiment, the portable machining apparatus 1 or 50 receives the rechargeable battery 7 or 83 as a power supply. In some embodiments, the electric component compartment 30 or 80 and the internal support 35 or 90 can also be used for a portable machining apparatus powered by an alternating current (AC) from utility power supply (ex. 100 V in Japan).

In the first or second embodiment, the laminate trimmer as a woodwork portable cutting tool for performing wood trimming or grooving and a double groove cutter as a stonework portable cutting tool for performing grooving of a concrete wall are examples of the portable machining apparatus. In some embodiments, the electric component compartment 30 or 80 and the internal support 35 or 90 can also be used for, for example, a portable circular saw or a jigsaw as a woodwork portable cutter for cutting wood.

Instead of power tools for performing the above processes, the electric component compartment 30 or 80 and the internal support 35 or 90 can also be used for other electric work machine for performing various operations including, for example, a rechargeable cleaner for cleaning, a rechargeable fan for creating a cool air current, a rechargeable gardening tool such as a pruner or a hedge trimmer, and a rechargeable blower for producing a strong blow.

The body housing 81 in the second embodiment is an example of the housing. The tip tools 74 in the second embodiment are examples of the tip tool. The capacitor 86 in the second embodiment is an example of the first electric component. The wireless communication adaptor 87 in the second embodiment is an example of the second electric component. The imaginary plane S in the second embodiment is an example of the common plane.

The cylinder 2B and the raised portion 2A in the first embodiment and the body housing 81 in the second embodiment are examples of the housing. The gearshift unit 33 in the first embodiment and the capacitor 86 in the second embodiment are examples of the first electric component. The wireless communication adaptor 34a in the first embodiment and the wireless communication adaptor 87 in the second embodiment are examples of the second electric component. The right in the first embodiment and the left in the second embodiment are examples of the first side. The left in the first embodiment and the right in the second embodiment are examples of the second side. The first wall 35a in the first embodiment and the pressure frame 90b in the second embodiment are examples of the first positioner. The second wall 35b in the first embodiment and the enclosure 90a in the second embodiment are examples of the second positioner.

REFERENCE SIGNS LIST

W workpiece
1 portable machining apparatus (laminate trimmer)
2 housing
2A raised portion
2B cylinder
2R right half
2RA right raised portion
2RB right cylinder
2L left half
2LA left raised portion
2LB left cylinder
2Aa first frame
2Ab second frame
2Ac window
2Ad third frame
2Ae opening
2S screw
3 rack gear
4 depth scale
5 base
5a through-hole
6 base attachment
6a thumbscrew
6b wheel gear
6c knob dial
6d window
7 battery
7a removal button
7b remaining capacity indicator
7c rail
7L long side
7S short side
7D thickness side
10 electric motor
11 motor shaft
J motor axis
12, 13 bearing
14 cooling fan
15 bit (tip tool)
20 cover case
21 battery mount
22 rail receiver
23 positive electrode terminal
24 negative electrode terminal
25 control terminal
26 lock recess
30 electric component compartment
30L compartment long side
30S compartment short side
S imaginary plane
31 controller
31a capacitor
31b lead
31c connector
32 activation switch (third electric component)
32a operation part
32b activation button
32c stand-by button
32e board
33 gearshift unit (first electric component)
33a operation part
33b base portion
34 wireless communication unit
34a wireless communication adaptor (second electric component)
34b adaptor receiver
34c cap
34d holding arm
34e engagement arm
34f engagement portion
34g engagement protrusion
35 internal support
35a first wall
35b second wall (enclosure)
35c stepped portion
V1, V2 gap
50 portable machining apparatus (double groove cutter)
51 base
52 stationary cover
53 body support shaft
60 machining apparatus body
61 movable cover
62 dust collector duct
63 hose
64 dust collector
65 front handle
66 rear handle
67 switch lever
70 drive
71 electric motor
71a motor housing
71b motor shaft
72 deceleration gear
72a gear housing
73 output shaft
P output axis
74 blade (tip tool)
75 spacer
76 fastening nut
77 arrow (rotation direction of blade 74)
80 electric component compartment
80L compartment long side
80S compartment short side
81 body housing
81L left half
81R right half
81c adaptor slot
81d holding frame (right)
81e holding frame (left)
81f presser
81g recess
82 battery mount
83 battery
83L long side
83S short side
83D thickness side
84 wireless communication unit
85 controller
85a, 85b holding frame
86 capacitor (first electric component)
87 wireless communication adaptor (second electric component)
87a engagement portion
88 adaptor receiver
89 cap
89a holding arm
89b engagement arm
89c engagement tab
89d engagement protrusion
90 internal support
90a enclosure
90b pressure frame 90c opening
90d pressure wall
90e presser
90f groove

What is claimed is:

1. A portable machining apparatus, comprising:
a housing;
an electric motor installed in the housing, the electric motor including a motor shaft extending in an axial direction;
a tip tool partially or fully exposed outside the housing, the tip tool being rotatable by the electric motor;
a controller installed in the housing and aligned with the electric motor in the axial direction, the controller being configured to control an operation of the electric motor;
a first electric component and a second electric component installed in an electric component compartment between the controller and the electric motor, the first electric component and the second electric component being aligned in a same plane perpendicular to an axis of the motor shaft; and
an internal support having a rectangular prism shape, the internal support positioning the first electric component and the second electric component relative to each other, the internal support including
a first positioner which is a framed enclosure located at a first side of the internal support, wherein the first electric component is disposed inside the first positioner, and
a second positioner which is a framed enclosure separate from the first positioner and is located at a second side of the internal support opposite to the first side so as to be aligned side-by-side with the first positioner, wherein the second electric component is disposed inside the second positioner in a removable manner.

2. The portable machining apparatus according to claim 1, further comprising:
a battery being a rectangular prism with long sides and short sides,
wherein the short sides of the battery are perpendicular to the axis,
the electric component compartment has
compartment long sides parallel to the long sides of the battery, and
compartment short sides parallel to the short sides of the battery, and
the first electric component and the second electric component are aligned along the compartment short sides.

3. The portable machining apparatus according to claim 1, wherein
the first electric component includes
a body, and
an operation part movable relative to the body,
the housing includes a window, and
the operation part protrudes outside the housing through the window.

4. The portable machining apparatus according to claim 1, wherein
the housing includes an opening,
the second electric component is removably installed in the electric component compartment through the opening, and
the portable machining apparatus further comprises a cap removably attached to the housing to close the opening and be a part of a side wall of the housing.

5. The portable machining apparatus according to claim 4, wherein
the first electric component and the second electric component are aligned in a direction in which the second electric component is attached to or removed from the second rectangular frame of the internal support.

6. The portable machining apparatus according to claim 1, wherein
the controller has a mount surface receiving a circuit component, and the mount surface faces downward toward the electric component compartment.

7. The portable machining apparatus according to claim 1, further comprising:
a contact portion extending perpendicular to the motor shaft, the contact portion being configured to come in contact with a workpiece; and
a base window located in one surface of a base attachment attached to the housing to be parallel to the motor shaft to allow visual observation of a processing target portion,
wherein the motor shaft extends vertically, the base window is at a front of the base attachment, and the first electric component and the second electric component are laterally aligned with respect to the base window.

8. The portable machining apparatus according to claim 7, further comprising:
a third electric component for activation, the third electric component being located on a front surface of the housing,
wherein the first electric component, the second electric component, and the third electric component are aligned in the same plane perpendicular to the axis of the motor shaft.

9. The portable machining apparatus according to claim 1, wherein
the first electric component includes a gearshift unit operable to change a rotational speed of the electric motor, and
the second electric component includes a wireless communication adaptor removably installed in the electric component compartment to perform wireless communication with an external device.

10. An electric work machine, comprising:
a battery;
an electric motor installed in a housing and drivable by the battery;
a controller installed in the housing to control an operation of the electric motor;
a first electric component and a second electric component installed in an electric component compartment in the housing; and
an internal support having a rectangular prism shape, the internal support positioning the first electric component and the second electric component relative to each other, the internal support including
a first positioner which is a framed enclosure located at a first side of the internal support, wherein the first electric component is disposed inside the first positioner, and
a second positioner which is a framed enclosure separate from the first positioner and is located at a second side of the internal support opposite to the first side so as to be aligned side-by-side with the first positioner, wherein the second electric component is disposed inside the second positioner in a removable manner, wherein the first electric component, the internal support, and the second electric component are linearly aligned with one another.

11. The electric work machine according to claim 10, wherein
the first electric component is cylindrical, and
the first positioner extends in a longitudinal direction of the first electric component and includes a restrictor restricting radial displacement of the first electric component.

12. The electric work machine according to claim 10, wherein
the enclosure of the second positioner includes a groove to allow attachment of the second electric component to the housing.

13. The electric work machine according to claim 10, wherein
the housing is laterally dividable into a right half and a left half along a motor shaft of the electric motor, and
the internal support is held between the right half and the left half and positioned in the housing.

14. The portable machining apparatus according to claim 2, wherein
the first electric component includes
a body, and
an operation part movable relative to the body,
the housing includes a window, and
the operation part protrudes outside the housing through the window.

15. The portable machining apparatus according to claim 2, wherein
the housing includes an opening,
the second electric component is removably installed in the electric component compartment through the opening, and
the portable machining apparatus further comprises a cap removably attached to the housing to close the opening and be a part of a side wall of the housing.

16. The portable machining apparatus according to claim 1, wherein
the second electric component has a rectangular prism shape, and
the enclosure of the second positioner has a rectangular shape.

17. The portable machining apparatus according to claim 1, wherein
the first electric component, the second electric component, and the internal support are aligned in the same plane perpendicular to the axis of the motor shaft.

18. The portable machining apparatus according to claim 17, further comprising:
an activation switch for activation, the activation switch being located on a front surface of the housing,
wherein the first electric component, the second electric component, and the internal support are aligned in the same plane perpendicular to an operation direction of the activation switch.

19. The portable machining apparatus according to claim 1, wherein
the framed enclosure of the first positioner has a rectangular shape,
the framed enclosure of the second positioner has a rectangular shape having a larger size than the framed enclosure of the first positioner, and
the first positioner is connected to the second positioner via a stepped up portion.

* * * * *